(12) United States Patent
Hawes et al.

(10) Patent No.: US 12,001,002 B2
(45) Date of Patent: Jun. 4, 2024

(54) SLIDE IMAGING APPARATUS

(71) Applicant: VENTANA MEDICAL SYSTEMS, INC., Tucson, AZ (US)

(72) Inventors: William Roland Hawes, Hertfordshire (GB); Jagdish Pankhania, Harrow (GB)

(73) Assignee: VENTANA MEDICAL SYSTEMS, INC., Tucson, AZ (US)

(*) Notice: Subject to any disclaimer, the term of this patent is extended or adjusted under 35 U.S.C. 154(b) by 311 days.

(21) Appl. No.: 17/529,974

(22) Filed: Nov. 18, 2021

(65) Prior Publication Data

US 2022/0075174 A1 Mar. 10, 2022

Related U.S. Application Data

(63) Continuation of application No. 16/477,834, filed as application No. PCT/EP2018/050567 on Jan. 10, 2018, now Pat. No. 11,231,574.

(30) Foreign Application Priority Data

Jan. 13, 2017 (EP) .................................. 17151434.2

(51) Int. Cl.
*G02B 21/26* (2006.01)
(52) U.S. Cl.
CPC .................................... *G02B 21/26* (2013.01)
(58) Field of Classification Search
CPC ........ G02B 21/13; G02B 21/26; G02B 21/34; G01N 1/312; G01N 1/2813; G01N 35/028;
(Continued)

(56) References Cited

U.S. PATENT DOCUMENTS 4,248,498 A * 2/1981 Georges ................. G02B 21/26
356/244
4,453,807 A 6/1984 Faulkner et al.
(Continued)

FOREIGN PATENT DOCUMENTS

CN 101159138 4/2008
CN 103796728 5/2014
(Continued)

OTHER PUBLICATIONS https://www.youtube.com/watch?v=hrlUIBHU8xE, video describing the Leica Microsystems Lica SCN400 with Leica SL801, Feb. 3, 2011, retrieved segments May 9, 2022, 16 pages.
(Continued)

*Primary Examiner* — Mustak Choudhury
(74) *Attorney, Agent, or Firm* — Kilpatrick Townsend & Stockton LLP

(57) ABSTRACT

A slide imaging apparatus that includes a copy holder moving system and an imaging system. The copy holder moving system includes a movable stage configured to move along first and second slide movement axes relative to the imaging system, wherein the imaging system is configured to form an image of a sample mounted on a slide located in the/each imaging location on the movable stage during an image forming process that includes the movable stage moving relative to the imaging system along the first and second slide movement axes. The copy holder moving system also includes a copy holder configured to be mounted to the movable stage, wherein the copy holder is configured to be mounted to the movable stage in each of a plurality of indexing positions.

19 Claims, 19 Drawing Sheets

(58) Field of Classification Search
CPC ...... G01N 35/0029; G01N 2035/00138; B01L 9/52; B01L 2300/0822; F16B 5/0635; F16B 5/0057; F16B 5/10; F16B 2/18
See application file for complete search history.

(56) References Cited

U.S. PATENT DOCUMENTS

| | | | |
|---|---|---|---|
| 4,453,907 A * | 6/1984 | Taguchi | B29C 48/10 |
| | | | 425/72.1 |
| 4,836,667 A * | 6/1989 | Ozeki | G02B 21/24 |
| | | | 359/398 |
| 5,659,421 A * | 8/1997 | Rahmel | G02B 21/26 |
| | | | 359/393 |
| 6,118,582 A * | 9/2000 | Del Buono | B01L 3/50855 |
| | | | 359/398 |
| 6,522,774 B1 | 2/2003 | Bacus et al. | |
| 6,640,014 B1 | 10/2003 | Price | |
| 6,711,283 B1 | 3/2004 | Soenksen | |
| 7,485,834 B2 | 2/2009 | Gouch | |
| 7,682,573 B1 * | 3/2010 | DeBolt | G02B 21/34 |
| | | | 422/534 |
| 8,712,116 B2 | 4/2014 | Gouch | |
| 9,116,035 B2 | 8/2015 | Gouch | |
| 11,231,574 B2 | 1/2022 | Hawes et al. | |
| 2014/0071438 A1 | 3/2014 | Gouch et al. | |
| 2014/0362436 A1 * | 12/2014 | Forget | G02B 21/26 |
| | | | 359/391 |

FOREIGN PATENT DOCUMENTS

| | | |
|---|---|---|
| EP | 0245089 | 11/1987 |
| EP | 00534247 | 2/2002 |
| JP | S62269924 A | 11/1987 |
| JP | H09152556 | 6/1997 |
| WO | 2013017855 | 2/2013 |

OTHER PUBLICATIONS

U.S. Appl. No. 16/477,834, Non-Final Office Action, dated Jun. 8, 2021, 10 pages.
U.S. Appl. No. 16/477,834, Notice of Allowance, dated Sep. 29, 2021, 10 pages.
U.S. Appl. No. 16/477,834, Notice of Allowance, dated Aug. 13, 2021, 8 pages.
International Application No. PCT/EP2018/050567, International Preliminary Report on Patentability, dated Jul. 25, 2019, 7 pages.
International Application No. PCT/EP2018/050567, International Search Report and Written Opinion, dated Mar. 29, 2018, 9 pages.
European Application No. 23152724.3 , "Extended European Search Report", dated Jun. 15, 2023, 6 pages.

* cited by examiner

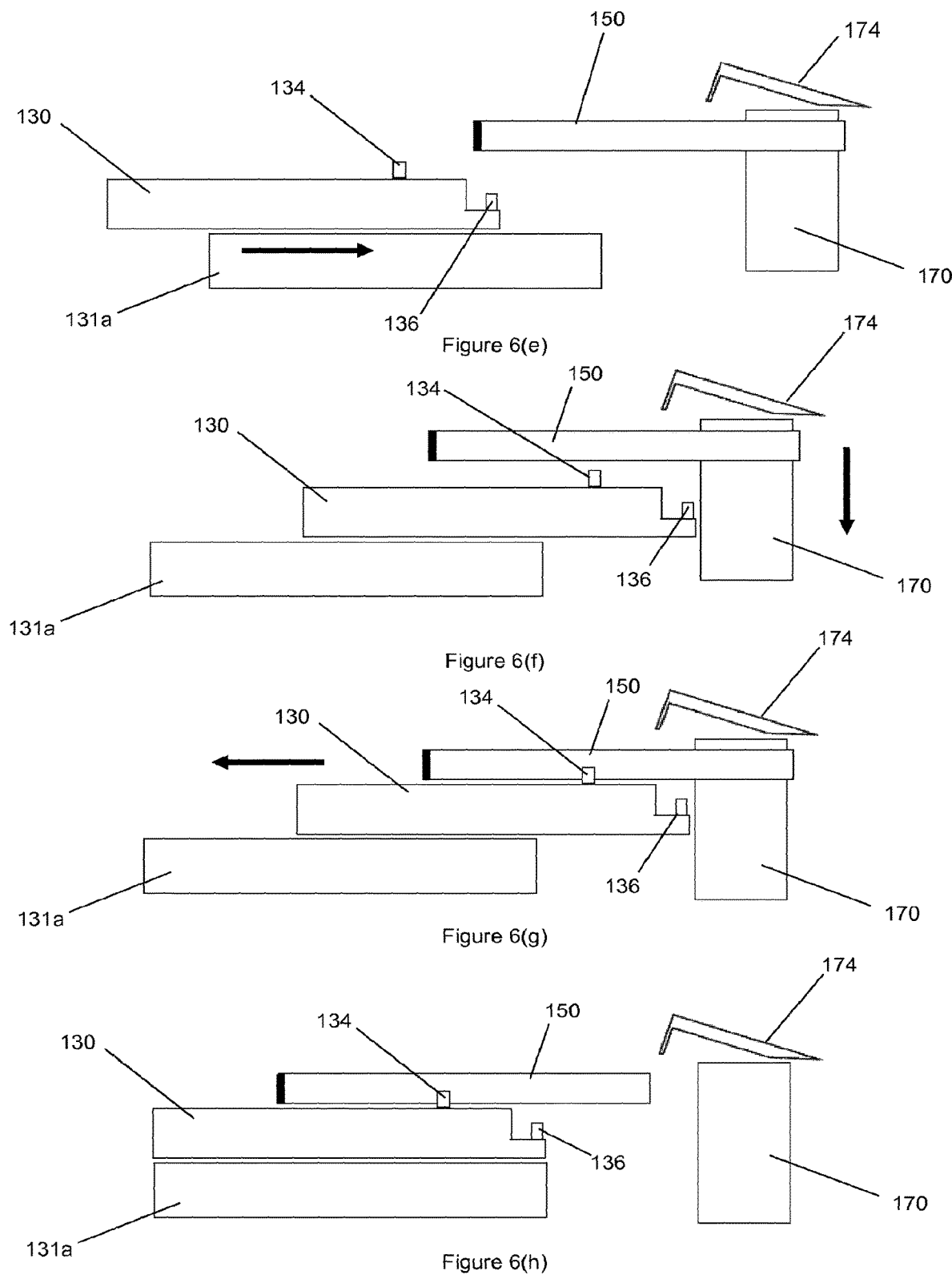

us 12,001,002 B2

SLIDE IMAGING APPARATUS

FIELD OF THE INVENTION

This invention relates to a slide imaging apparatus, e.g. for use in digital pathology.

BACKGROUND

A slide imaging apparatus is an imaging apparatus configured to form an image of a sample mounted on a slide. The image formed by modern slide imaging apparatuses is typically a digital image, and such an image may therefore be referred to as a "digital slide". Typically, the sample mounted on the slide is a biological specimen, such as a tissue sample. Typically the slide is a glass slide.

Typically, a slide imaging apparatus is used in digital pathology, which can be understood as an image-based information environment that allows for the management of information generated from a digital slide Where a slide imaging apparatus is capable of forming an image covering the majority if not all the surface of a slide, e.g. through a scanning process, the slide imaging apparatus may be referred to as a "whole slide imaging" apparatus.

A slide imaging apparatus may use a 2D camera or a line scan detector to form the image of a sample mounted on a slide.

Examples of slide imaging apparatuses are described in U.S. Pat. No. 6,522,774, EP00534247B1, U.S. Pat. No. 6,640,014B1, U.S. Pat. No. 6,711,283B1, U.S. Pat. No. 9,116,035, WO2013017855 and U.S. Pat. No. 8,712,116, for example.

FIG. 1(a) shows an example imaging system 10 for use in a slide imaging apparatus. The imaging system 10 of FIG. 1(a) includes a line scan detector 14 and operates according to known principles.

In more detail, the imaging system 10 of FIG. 1(a) includes an imaging lens 12 configured to focus light originating from a sample mounted on a slide 80 onto the line scan detector 14. The line scan detector 14 typically includes a linear array of pixels.

In the imaging system 10, the line scan detector 14 is configured to acquire 1D image data from an elongate region 82 of the sample that extends along a swathe width axis (x-axis). The swathe width axis is perpendicular to a scan length axis (y-axis).

FIG. 1(b) shows an example copy holder moving system 20 for use with the imaging system 10 of FIG. 1(a) in a slide imaging apparatus.

The copy holder moving system 20 includes a movable stage 30 and a copy holder 60. The movable stage 30 is configured to be moved along the scan length axis (y-axis) and the swathe width axis (x-axis). The copy holder 60 is configured to be mounted to the movable stage 30. The copy holder 60 includes a plurality of apertures in the form of slots 62, each slot 62 being configured to loosely hold a respective slide 80. A top surface 30a of the movable stage 30 includes a plurality of metal slide support pins (not shown in FIG. 1(b)) located so that when the copy holder 60 is mounted on the movable stage 30, the/each slide 80 loosely held by a slot 62 on the copy holder 60 is supported by three metal slide support pins.

It is preferred that top surfaces of the metal slide support pins which contact the slides 80 are coplanar so that the imaging system 10 is able to more easily retain focus of samples mounted on the slides 80 supported by the slide support pins whilst it is moved by the moveable stage 30.

In use, the copy holder 60 holding a plurality of slides 80 is mounted to the movable stage 30. The movable stage 30, and therefore each slide 80 held by the copy holder 60 mounted to the movable stage 30, is moved along the scan length axis (y-axis) and along the swathe width axis (x-axis) so that the imaging system is able to form an image of a sample mounted on each slide 80.

In more detail, the imaging system 10 is configured to form an image of a respective sample mounted on each slide 80 in a plurality of swathes, wherein each swathe is formed by a group of scan lines, each scan line being acquired using the scan line detector 14 from a respective elongate region 82 on the surface of the sample that extends along the swathe width axis, wherein each group of scan lines is acquired whilst the slide 80 is moved relative to the scan line detector 14 along the scan length axis (y-axis), e.g. in the direction labelled 16 in FIG. 1(a), using the copy holder moving system 20. After one swathe has been acquired, the slide 80 is moved along the swathe width axis (x-axis), e.g. in the direction labelled 15 in FIG. 1(a), to allow a further swathe to be acquired by moving the slide 80 along the scan length axis (y-axis). This further swathe may be acquired by moving the slide 80 along the scan length axis in a direction opposite to the direction labelled 16 in FIG. 1(a), e.g. such that the slide 80 is moved along a serpentine path during the image forming process.

Typically, an individual swathe acquired from a sample mounted on a slide 80 may, at the surface of the slide 80, e.g. be approximately 1 mm wide along the swathe width axis (x-axis) and between 2 mm and 60 mm long along the scan length direction (y-axis). Multiple swathes can be combined to generate an image wider than the (e.g. approximately 1 mm) width of an individual swathe.

A focus setting of the imaging system 10 of FIG. 1(a) may be adjusted, for example, by moving the imaging lens 12 along an imaging axis 13. Imperfections in the slide support pins, imperfections in a slide 80 resting on the slide support pins, or an uneven sample mounted on the slide 80, can cause loss of focus whilst a digital image of the sample is being acquired. Therefore, during the acquisition of a swathe, a focus setting of the imaging system 10 can be dynamically adjusted to maintain the sample in focus along the length of the sample along the scan length axis (y-axis). Techniques suitable for measuring and dynamically adjusting a focus setting of the imaging system 10 to maintain the sample in focus along the length of the sample as the slide 80 is moved along the scan length axis are described in the literature, see e.g. U.S. Pat. No. 7,485,834, WO2013/017855 and US2014/0071438.

An example slide imaging apparatus implementing the principles described above with reference to FIG. 1(a) and FIG. 1(b) is the SCN400 slide scanner marketed by Leica™. A video describing the operation of the SCN400 slide scanner can be found at https://www.youtube.com/watch?v=hrlUI8HU8xE.

The present inventors have observed some challenges with a slide imaging apparatus implementing the principles described above with reference to FIG. 1(a) and FIG. 1(b).

For example, the present inventors have observed that the more slides 80 that can be held by the copy holder 60, the wider the slide imaging apparatus needs to be in order to allow the copy holder 60 to be moved into a position where an image of a sample mounted on each slide 80 can be formed by the imaging system 10. For example, a copy holder 60 that holds six slides generally requires a wider slide imaging apparatus in order to accommodate movement of the copy holder, compared with a copy holder that holds only two slides.

The present inventors have also observed that the copy holder 60 is typically manually mounted onto the movable stage 30. This job can be fiddly as the slides 80 may be loosely held by the copy holder 60 and so can fall out, and a user's hand may damage one or more components of the slide imaging apparatus during the copy holder mounting process.

The present invention has been devised in light of the above considerations.

SUMMARY OF THE INVENTION

A first aspect of the invention may provide a slide imaging apparatus that includes:
- a copy holder moving system; and
- an imaging system;

wherein the copy holder moving system includes:
- a movable stage configured to move along first and second slide movement axes relative to the imaging system, wherein a top surface of the movable stage includes a plurality of slide support pins configured to support one or more slides in one or more imaging locations on the movable stage, wherein the imaging system is configured to form an image of a sample mounted on a slide located in the/each imaging location on the movable stage during an image forming process that includes the movable stage moving relative to the imaging system along the first and second slide movement axes;
- a copy holder configured to be mounted to the movable stage, wherein the copy holder includes a plurality of apertures, each aperture being configured to hold a respective slide;

wherein the copy holder is configured to be mounted to the movable stage in each of a plurality of indexing positions that include:
- a first indexing position in which a first subset of the slides held by the copy holder are supported in the one or more imaging locations by the slide support pins;
- a second indexing position in which a second subset of the slides held by the copy holder are supported in the one or more imaging locations by the slide support pins.

In this way, different subsets of the slides held by the copy holder can be located in the imaging location(s) at different times, by moving the copy holder between indexing positions. This may allow for all slides held by a copy holder to be imaged, even if the number of slides held by the copy holder is larger than the number of imaging locations. Having a smaller number of imaging locations is useful, since it allows for a more compact imaging apparatus, since a smaller range of movement of the movable platform can be needed to allow the imaging system to form an image of the/each slide located in the/each imaging location.

It follows from the above discussion that the number of apertures for holding slides in the copy holder may be larger than the number of imaging locations on the movable stage.

The terms "copy holder", "holder" and "slide holder" may be used interchangeably herein. Thus, instances of the term "copy holder" may be replaced with "holder" or "slide holder" herein.

The first and second slide movement axes should be non-parallel, and may be perpendicular with respect to each other. For avoidance of any doubt, during the image forming process, the movable stage may move relative to the imaging system along the first slide movement axis at different times from when it moves along the second slide movement axis. It would also be possible for the movable stage to be moved along both the first and second slide movement axes at the same time.

The first and second slide movement axes are preferably parallel to an imaging plane of the imaging system. An imaging plane of the imaging system may be defined as a plane from which an image acquired by the imaging system is deemed to be in focus. Such a plane can usually be defined for any imaging system.

The copy holder and the movable stage may each have one or more indexing formations, which may be configured to cooperate with each other (e.g. one or more indexing formations on the copy holder may be configured to cooperate with one or more indexing formations on the movable stage) so as to act to fix the position of the copy holder relative to the movable stage when the copy holder is mounted to the movable stage in each indexing position.

The one or more indexing formations may include, for example, one or more pins formed on the movable stage and one or more corresponding holes formed in the copy holder, or one or more pins formed on the copy holder and one or more corresponding holes formed in the movable stage.

The number of indexing positions may be equal to the number of apertures for holding slides in the copy holder divided by the number of imaging locations on the movable stage. The number of slides in each subset of slides may be equal to the number of imaging locations on the movable stage.

The copy holder moving system may include a first motor configured to move the movable stage along the first slide movement axis and a second motor configured to move the movable stage along the second slide movement axis.

The copy holder moving system is preferably configured to perform an indexing process in which the copy holder is moved from one of the indexing positions to another of the indexing positions.

The copy holder moving system may include an indexing arm for holding the copy holder, and an indexing motor configured to move the indexing arm along an indexing axis that is non-parallel with respect to both the first and second slide movement axes.

The indexing process in which the copy holder is moved from one of the indexing positions to another of the indexing positions may include the indexing arm being moved by the indexing motor along the indexing axis as well as the movable stage being moved along the first and second slide movement axes by the first and second motors.

The indexing axis may be perpendicular to both the first and second slide movement axes. The first and second slide movement axes may be perpendicular to each other.

The copy holder moving system is preferably configured to perform a copy holder loading process in which the copy holder is moved from a predetermined copy holder loading location to be mounted on the movable stage in one of the indexing positions.

The copy holder loading process in which the copy holder is moved from a predetermined copy holder loading location to be mounted on the movable stage in one of the indexing positions may include the indexing arm being moved by the indexing motor along the indexing axis as well as the movable stage being moved by the first and/or second motors along the first and/or second slide movement axes.

In this way, the copy holder loading process can be performed using the same three motors that can be used to perform the above-described indexing process.

The copy holder and the movable stage may each have one or more engagement formations, which may be configured to engage with each other (e.g. one or more engagement formations on the copy holder may be configured to cooperate with one or more engagement formations on the movable stage) so that the movable stage is able to pull the copy holder away from the predetermined copy holder loading location during the copy holder loading process.

The engagement formations may include, for example, one or more pins formed on the movable stage and a lip located on a bottom surface of the copy holder.

The slide imaging apparatus may include a housing. The housing may house both the imaging system and the copy holder moving system.

The housing may include a slot, wherein the copy holder is configured to be put in the predetermined copy holder loading location by pushing it at least partially into the slot.

The copy holder moving system may include a stopping element for stopping the copy holder from being pushed past the predetermined copy holder loading location when it is pushed into the slot. The stopping element may be mounted on (e.g. a main body of) the indexing arm.

The copy holder moving system may include one or more copy holder guide surfaces for guiding the copy holder whilst it is pushed into and/or pulled out from the slot. The copy holder guide surfaces may be formed on the indexing arm. The copy holder guide surfaces may include a landing area for the copy holder to rest on.

The copy holder moving system is preferably configured to perform a copy holder unloading process in which the copy holder is moved from being mounted on the movable stage in one of the indexing positions to a predetermined copy holder unloading location.

The copy holder unloading process in which the copy holder is moved from being mounted on the movable stage in one of the indexing positions to a predetermined copy holder unloading location may include the indexing arm being moved by the indexing motor along the indexing axis as well as the movable stage being moved by the first and/or second motors along the first and/or second slide movement axes.

In this way, the copy holder unloading process can be performed using the same three motors that can be used to perform the above-described indexing process.

The movable stage may have a push surface configured to face the copy holder so that the push surface is able to push the copy holder towards the predetermined copy holder unloading location during the copy holder unloading process.

The copy holder unloading process in which the copy holder is moved from being mounted on the movable stage in one of the indexing positions to a predetermined copy holder unloading location may include the push surface pushing the copy holder at least partially out through the slot.

A second aspect of the invention may provide a slide imaging apparatus according to the first aspect of the invention, wherein the copy holder is omitted.

The invention also includes any combination of the aspects and preferred features described except where such a combination is clearly impermissible or expressly avoided.

For avoidance of any doubt, the use of the adjectives "top" and "bottom" in connection with an object may reflect an intended/preferred orientation when the object is used in a slide imaging apparatus, and should not be interpreted to require a specific orientation of that object at all times, unless this is explicitly stated. The adjectives "top" and "bottom" may therefore be replaced with the terms "first" and "second".

BRIEF DESCRIPTION OF THE DRAWINGS

Examples of these proposals are discussed below, with reference to the accompanying drawings in which:

FIGS. 6(a)-(h) show an example loading process performed by copy holder moving system of FIGS. 3(a)-(h).

DETAILED DESCRIPTION

Figure 2:
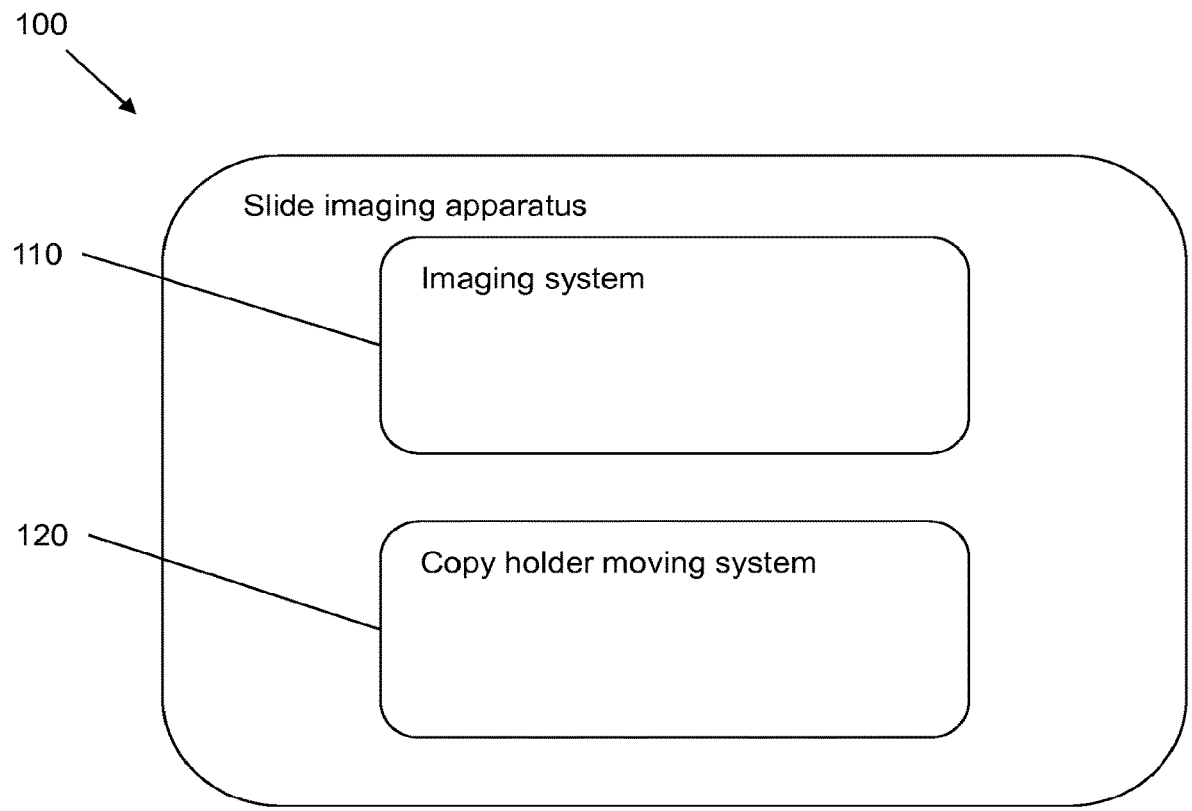
FIG. 2. shows an example slide imaging apparatus that includes an imaging system and a copy holder moving system.

FIG. 2. shows an example slide imaging apparatus 100 that includes an imaging system 110 and a copy holder moving system 120.

Figure 1A:
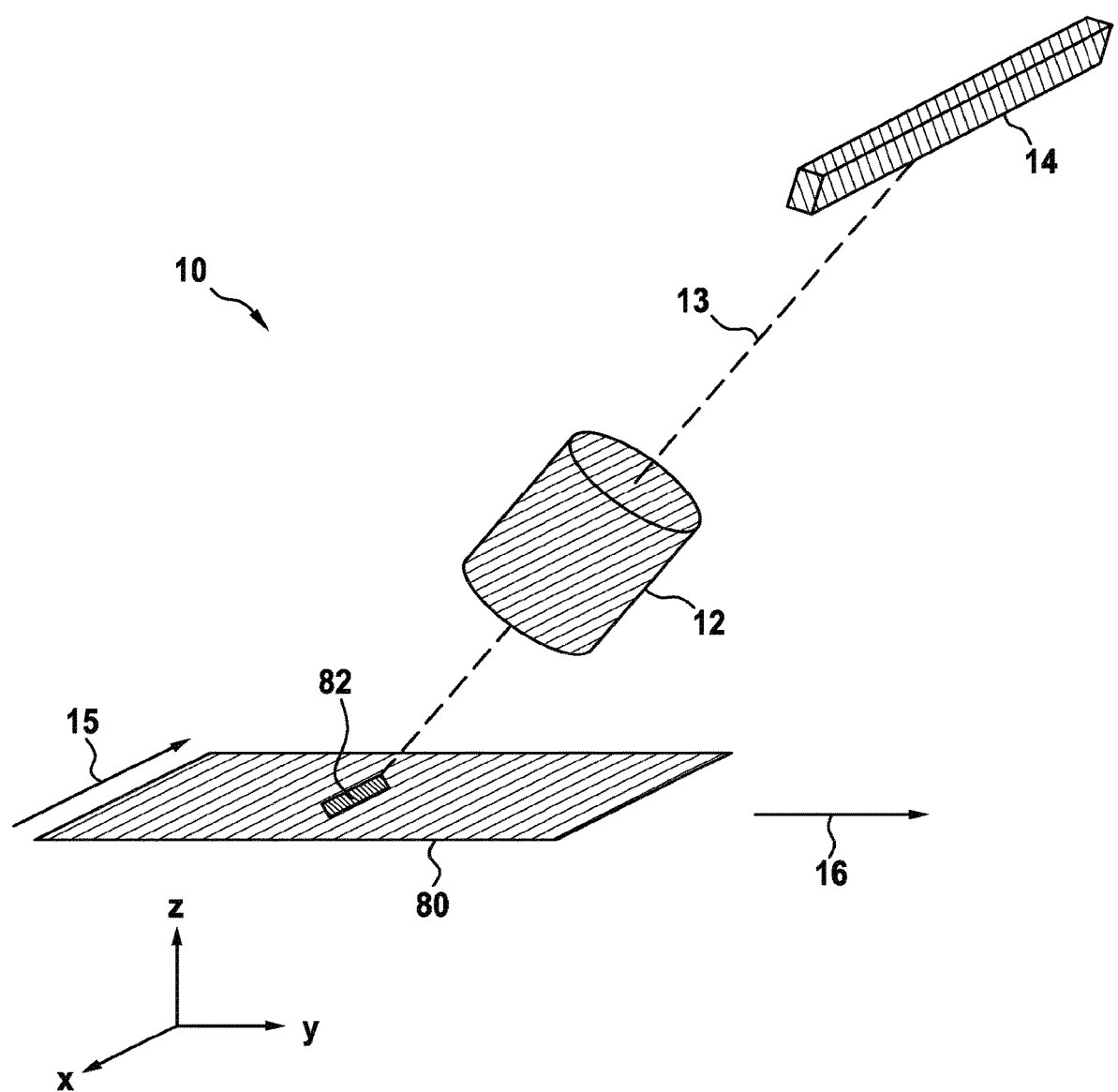
FIG. 1(a) shows an example imaging system for use in a slide imaging apparatus.
Figure 1B:
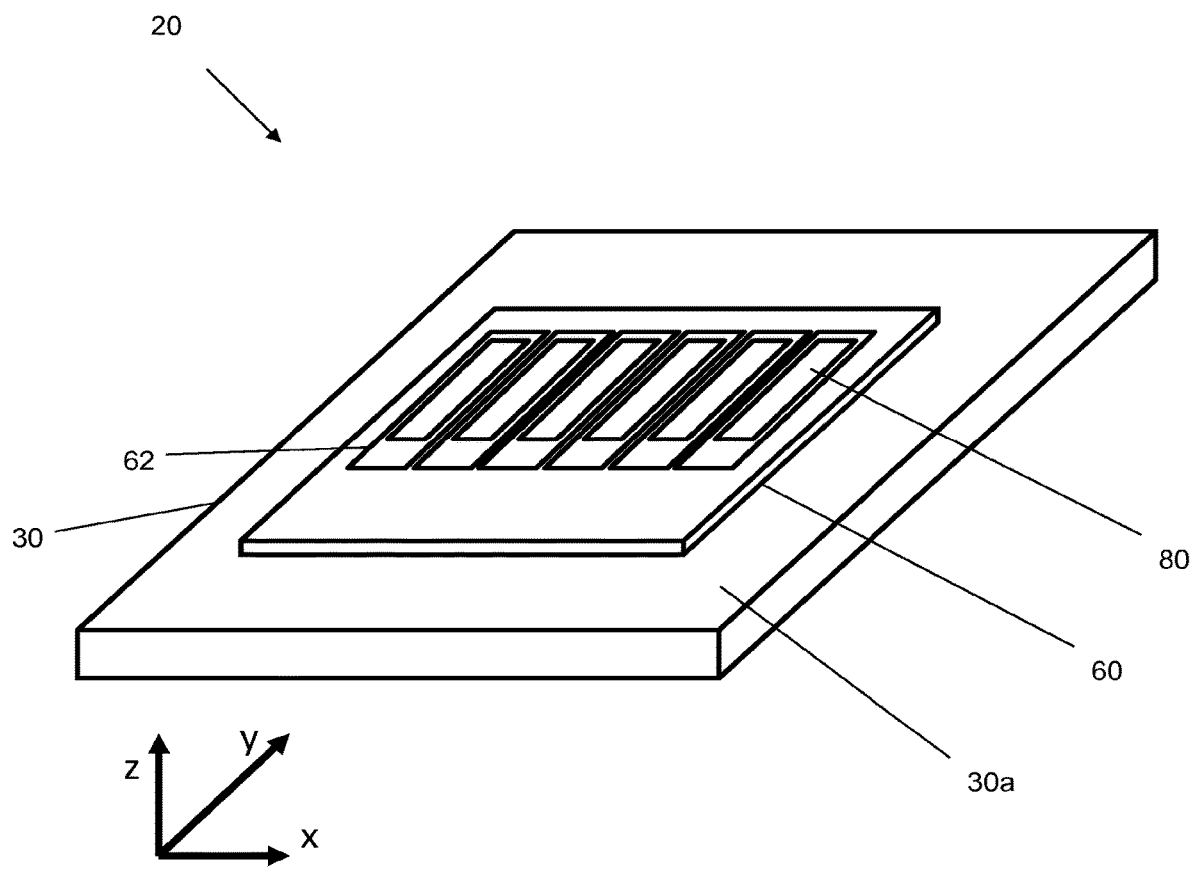
FIG. 1(b) shows an example copy holder moving system for use with the imaging system of FIG. 1(a) in a slide imaging apparatus.

The imaging system 110 may be the same as the imaging system 10 shown in FIG. 1(a), for example.

FIGS. 3(a)-(h) show the copy holder moving system 120 of FIG. 2 in more detail.

As shown in FIGS. 3(a)-(g), the copy holder moving system 120 includes a movable stage 130 and a copy holder 150. The copy holder moving system also includes an indexing arm 170, which is described in more detail below.

For clarity, FIGS. 3(a)-(f) and 3(h) show the copy holder moving system 120 without slides 80 being held by the copy holder 150.

Figure 3A:
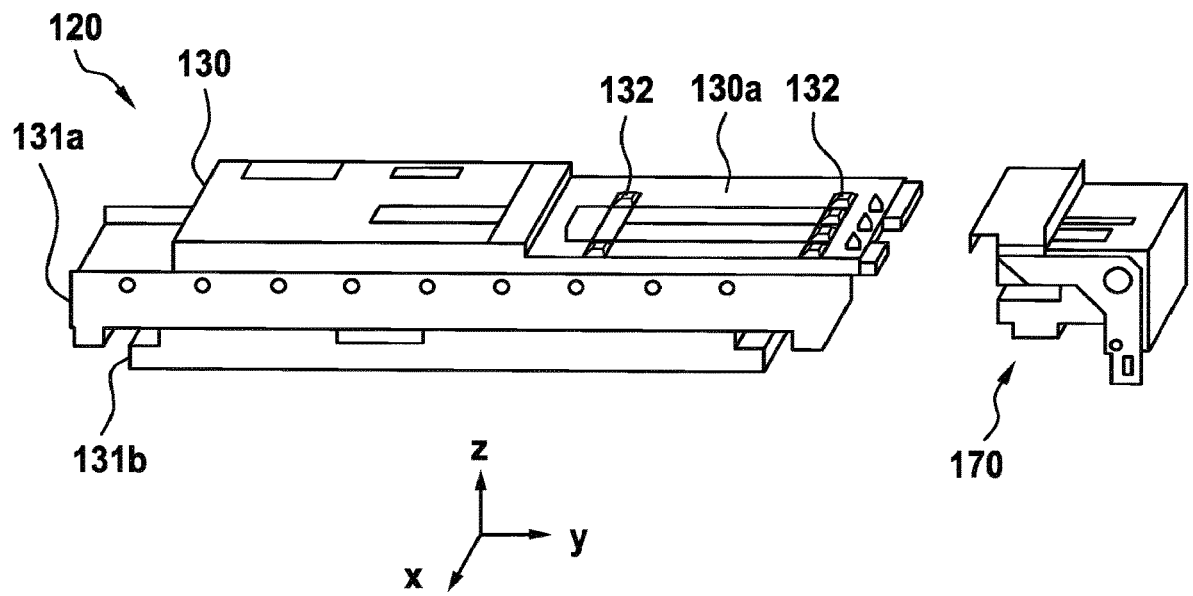
FIGS. 3(a)-(h) show the copy holder moving system of FIG. 2 in more detail.
Figure 3B:
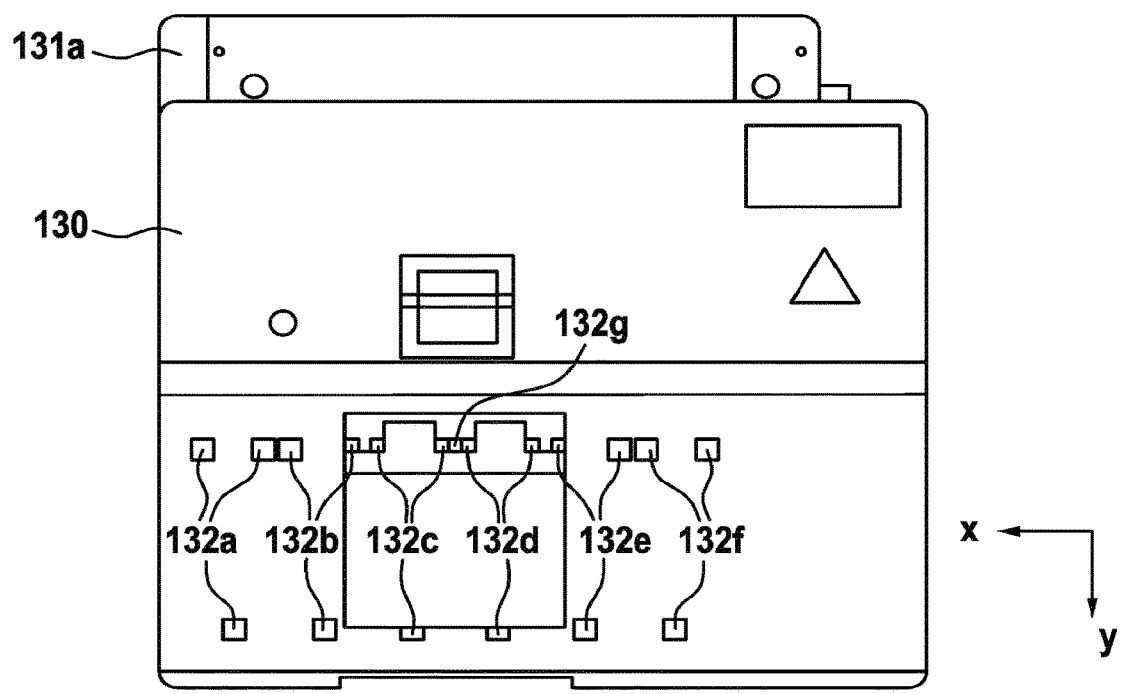
Figure 3C:
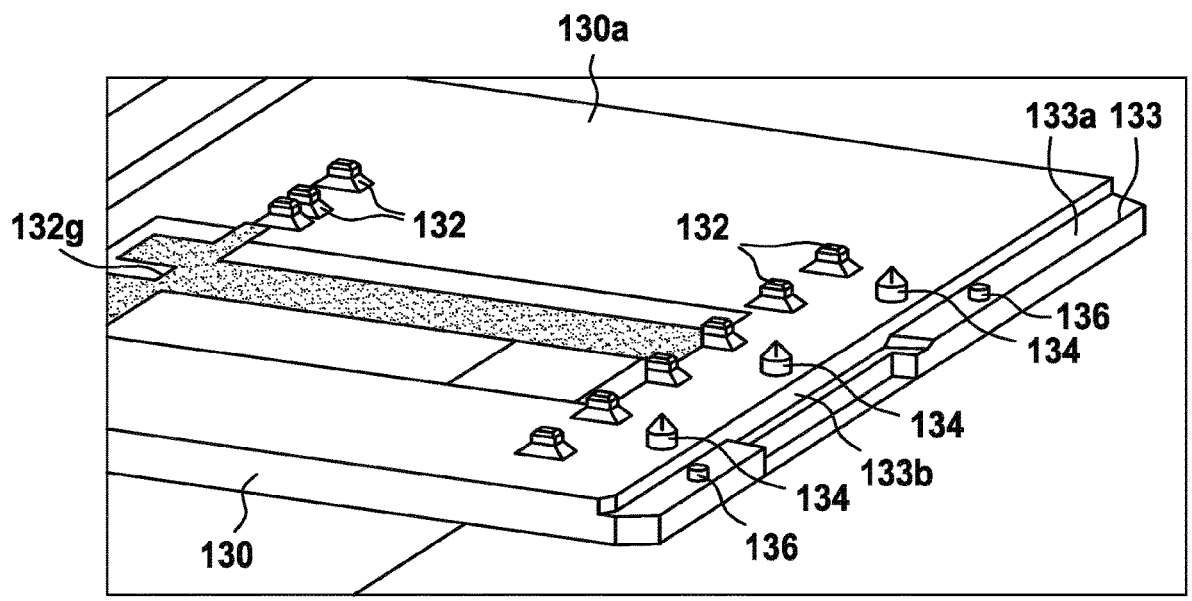
Figure 3D:
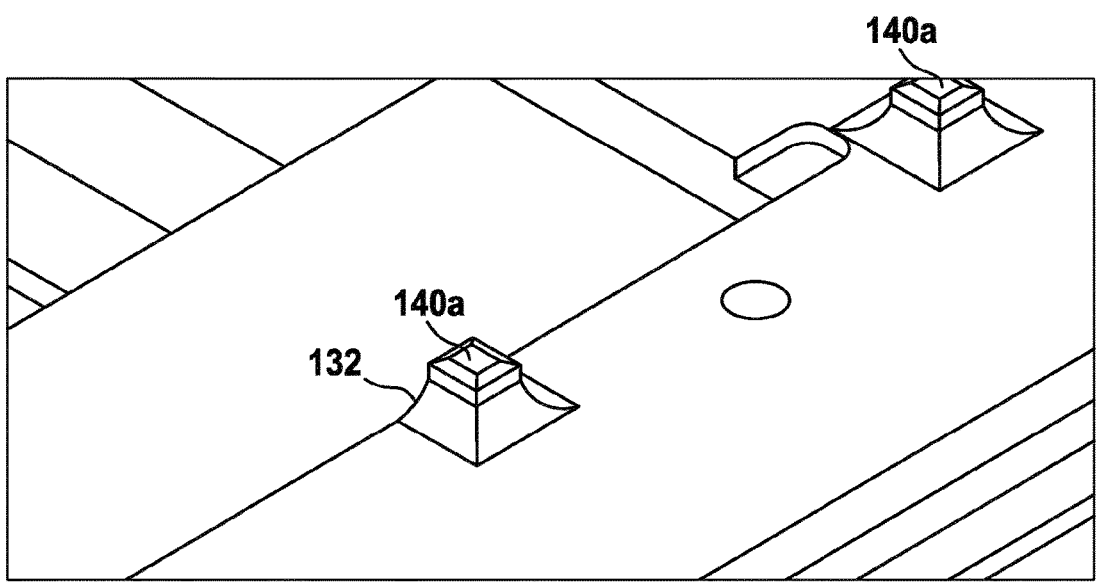
Figure 3E:
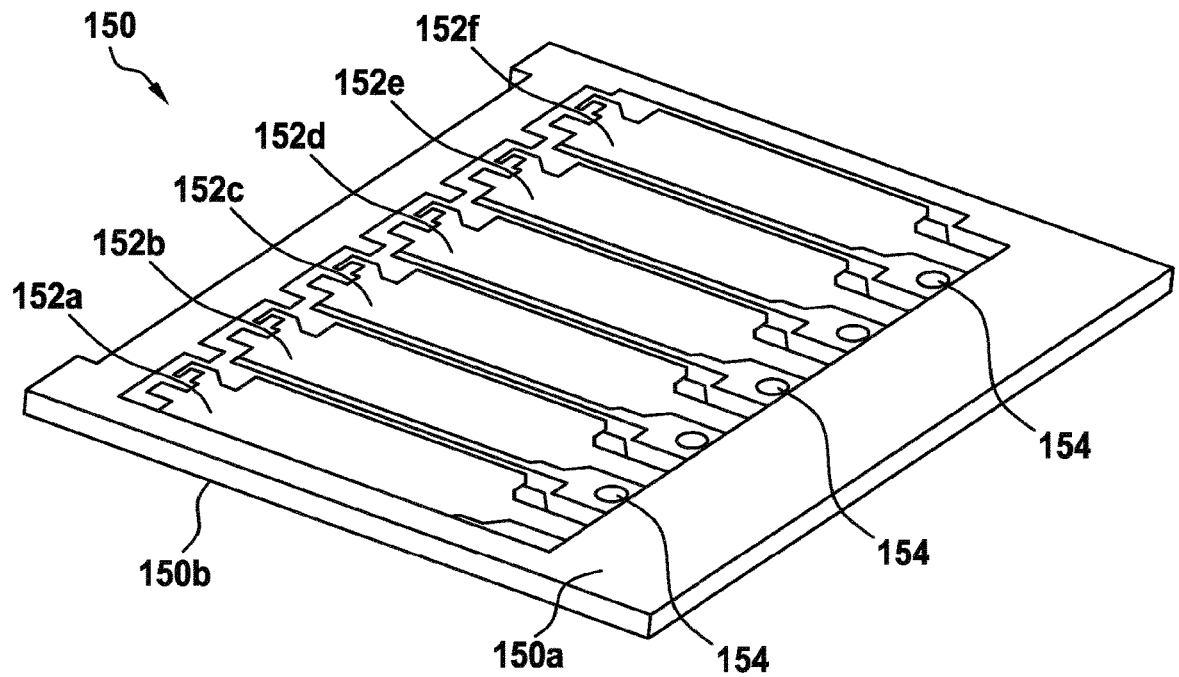
Figure 3F:
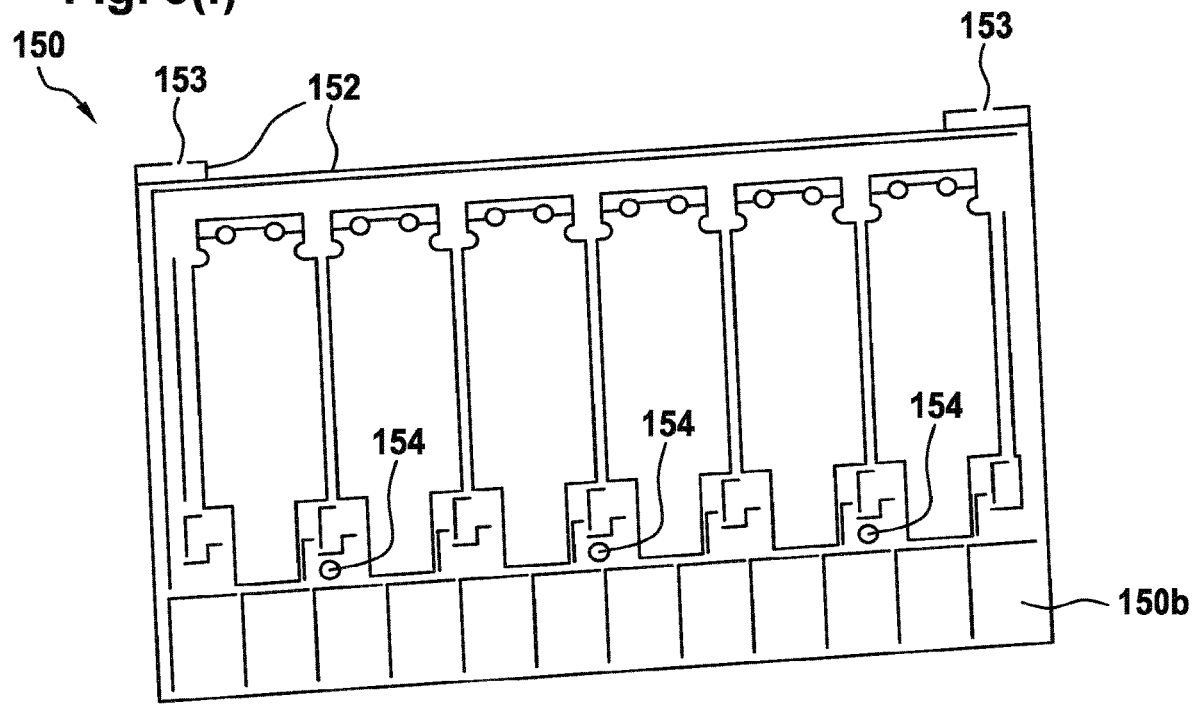
Figure 3G:
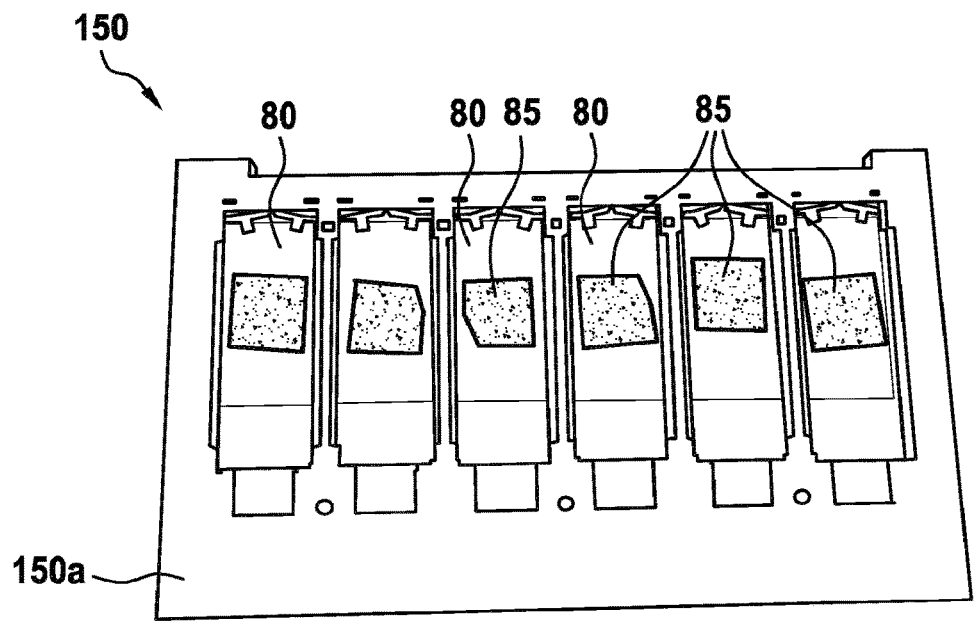

FIG. 3(g) shows slides 80 being held by the copy holder 150, wherein a respective sample 85 is mounted on each slide 80.

Figure 3H:
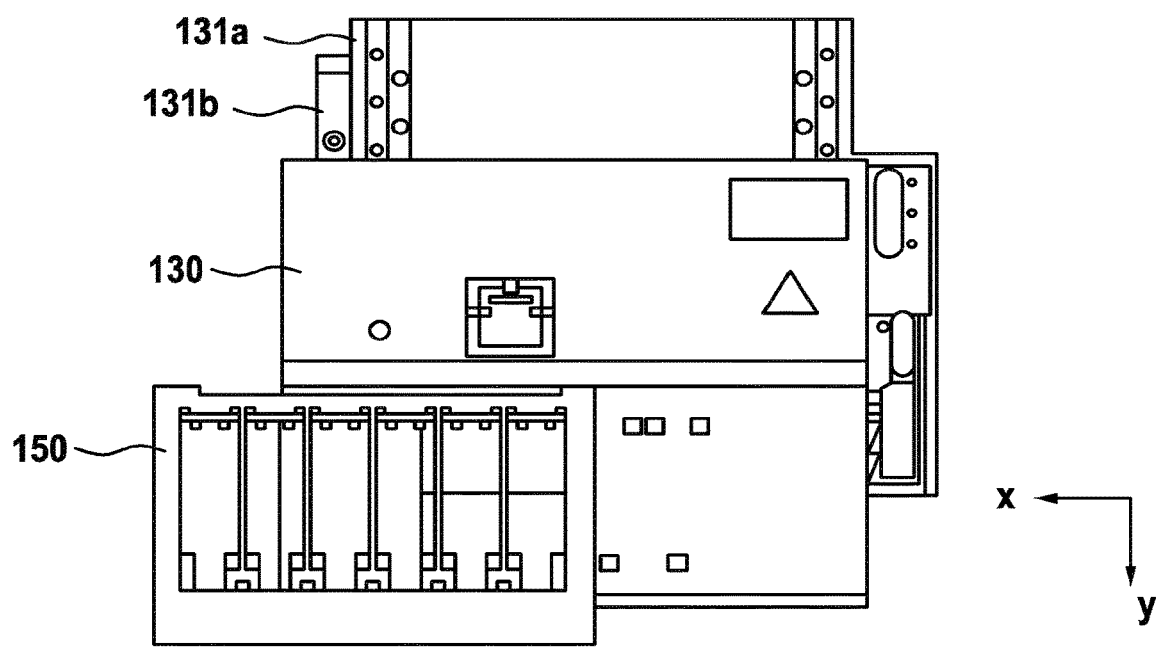

As shown e.g. in FIGS. 3(a) and 3(h), the movable stage 130 is the top plate in a three plate system that includes a middle plate 131a and a bottom plate 131b.

The copy holder moving system 120 includes a first motor (not shown) configured to move the movable stage 130 relative to the imaging system 110 along a first slide movement axis, referred to herein as a scan length axis (y-axis). In this example, the first motor is configured to move the movable stage 130 along the scan length axis by driving a first movement mechanism (not shown) The copy holder moving system 120 includes a second motor (not shown) configured to move the movable stage 130 relative to the imaging system 110 along a second slide movement axis, referred to herein as a swathe width axis (x-axis). In this example, the second motor is configured to move the middle plate 131a and as such the moveable stage 130 along the swathe width axis (x-axis) by driving a second movement mechanism (not shown).

In this example, the bottom plate 131b does not move relative to the imaging system 110.

The first and second movement mechanism (and indeed the third movement mechanism discussed below) may each respectively include, for example, a leadscrew, a linear motor system or a piezo drive. Of course, other movement mechanisms for providing such relative movement between the movable stage 130 and the imaging system 110 could equally be envisaged.

As shown e.g. in FIG. 3(a), a top surface 130a of the movable stage 130 includes a plurality of slide support pins 132.

As shown e.g. in FIG. 3(b), the slide support pins 132 of this example include the following groups of slide support pins 132:

a first group of three slide support pins 132a for supporting a slide held by the copy holder 150 in a first non-imaging location on the movable stage a second group of three slide support pins 132b for supporting a slide held by the copy holder 150 in a second non-imaging location on the movable stage a third group of three slide support pins 132c for supporting a slide held by the copy holder 150 in a first imaging location on the movable stage a fourth group of three slide support pins 132d for supporting a slide held by the copy holder 150 in a second imaging location on the movable stage a fifth group of three slide support pins 132e for supporting a slide held by the copy holder 150 in a third non-imaging location on the movable stage a sixth group of three slide support pins 132f for supporting a slide held by the copy holder 150 in a fourth non-imaging location on the movable stage The slide support pins 132 are therefore configured to support one or more slides 80 in two imaging locations on the movable stage 130, wherein the imaging system 110 is configured to form an image of a sample mounted on a slide 80 located in each imaging location on the movable stage 130 during an image forming process that involves the movable stage 130 moving relative to the imaging system 110 along the scan length and swathe width axes. This image forming process is described in more detail below.

The imaging system 110 is not configured to form an image of a sample mounted on a slide 80 located in any of the non-imaging locations on the movable stage 130. This allows the slide imaging apparatus 100 to be made more compact, since the imaging locations are close to each other and fall within a small surface area of the movable stage 130 so can be imaged with a smaller range of movement of the movable stage 130.

At least the slide support pins for supporting slides 80 in the imaging locations (i.e. the slide support pins 132c-d in the third and fourth groups) preferably have coplanar top surfaces 140a for supporting slides 80, so that the imaging system 110 is able to more easily retain focus of samples mounted on slides 80 supported by the slide support pins 132c-d whilst it is moved by the moveable stage 130 during an image forming process as described below.

The slide support pins 132a-b, 132e-f for supporting slides in the non-imaging locations may also have coplanar top surfaces 140a for supporting slides 80, though this is less important, since as noted above the imaging system is not configured to form an image of a sample mounted on a slide 80 located in any of the non-imaging locations.

The top surface 130a of the movable stage 130 is not flat, and includes a step at one end which forms a ledge 133 having a top surface 133a, as well as a push surface 133b the function of which will be described in more detail below.

Each of these groups of the slide support pins 132a-132f is arranged with a single pin for supporting one end of a slide 80 and a pair of pins for supporting an opposite end of the same slide 80.

Each of the six groups of the slide support pins 132a-132f as defined above is configured to support a typical pathology slide, which may have a length and width dimensions of 75 mm by 25 mm (3 by 1 inches).

In addition to the six groups defined to above, the slide support pins 132 also include a seventh group of slide support pins that includes a large slide support pin 132g and the single pins from the third and fourth groups of slide support pins 132c-d.

The large slide support pin 132g is slightly taller than the slide support pins in the first-sixth groups of slide support pins 132a-132f. This allows a large slide having a width dimension that is larger than a typical pathology slide to be supported by the seventh group of slide support pins, if a copy holder able to hold a large slide is used in place of the copy holder 150 shown in FIGS. 3(e)-(f).

Although a large slide supported by the seventh group of slide support pins would be inclined at an angle to a typical pathology slide supported by one of the six groups defined above (due to the slide support pin 132g being taller), it would be straight forward for the imaging system 110 to incline its imaging plane accordingly so that it can form an image of a sample mounted on the large slide. Such techniques are known in the art.

The top surface 130a of the movable stage 130 includes indexing formations, which in this example have the form of indexing pins 134. The function of these indexing formations is described in more detail below.

The top surface 133a of the ledge 133, which is part of the top surface 130a of the movable stage 130, includes engagement formations, which in this example have the form of copy holder engagement pins 136. The function of these engagement formations is described in more detail below. As will be described in more detail below, these copy holder engagement pins 136 are configured to engage corresponding engagement formations on the copy holder 150 so that the movable stage 130 is able to pull the copy holder 150 away from a predetermined copy holder loading location during a copy holder loading process.

FIGS. 3(e) and 3(f) show the copy holder 150 in further detail.

FIG. 3(e) shows the copy holder 150 with a top surface 150a facing upwards and a bottom surface 150b facing downwards. FIG. 3(f) shows the copy holder 150 with the bottom surface 150b facing upwards.

The copy holder 150 includes six apertures having the form of slots 152a-152f, each slot 152a-f being configured to loosely hold a respective slide such that a slide is able to rest in each of the slots 152a-f when the top surface 150a is facing upwards but will fall out if the bottom surface 150b is facing upwards.

As can be seen from FIG. 3(f) the bottom surface 150b of the copy holder 150 has a lip 152 at its periphery. As described in more detail below, this lip 152 is configured to engage with the copy holder engagement pins 136 so that the movable stage 130 is able to pull the copy holder 150 away from a predetermined copy holder loading location during a copy holder loading process.

As can also be seen from FIG. 3(f), the lip 152 includes cut-outs 153 configured to allow the copy holder engagement pins 136 formed on the movable stage 130 to pass through the cut outs 153 (and therefore the lip 152) during a pre-loading process described in more detail below.

FIG. 3(g) shows the copy holder 150 with a slide 80 loosely held in each aperture of the copy holder 150.

The copy holder 150 is configured to be mounted to the movable stage 130 in each of three indexing positions that include:
- a first indexing position in which a first subset of two slides held by the first and second apertures 152a-b of the copy holder 150 are supported in the first and second imaging positions by the slide support pins 132c-132d
- a second indexing position in which a second subset of two slides held by the third and fourth apertures 152c-d of the copy holder 150 are supported in the first and second imaging positions by the slide support pins 132c-132d
- a third indexing position in which a third subset of two slides held by the fourth and fifth apertures 152e-f of the copy holder 150 are supported in the first and second imaging positions by the slide support pins 132c-132d The copy holder 150 includes indexing formations, which in this example have the form of indexing holes 154 extending from the top surface 150a to the bottom surface 150b of the copy holder 150. The indexing pins 134 on the movable stage 130 are configured to cooperate with (by extending into) the indexing holes 154 so as to act to fix the position of the copy holder 150 relative to the movable stage 130 when the copy holder 150 is mounted to the movable stage 130 in each of the first-third indexing positions.

FIG. 3(h) shows the copy holder 150 mounted to the third indexing position.

The copy holder 150 may be mounted to the movable stage 130 in any of the first-third indexing positions e.g. by a user manually placing the copy holder 150 on the movable stage 130 in the relevant indexing position. However, the copy holder 150 is preferably mounted to the movable stage 130 in any of the first-third indexing positions via the loading and/or indexing processes described below.

The copy holder 150 may be unmounted from any of the first-third indexing positions on the movable stage 130 e.g. by a user manually removing the copy holder 150 from the movable stage 130. However, the copy holder 150 is preferably unmounted from any of the first-third indexing positions on the movable stage 130 via the unloading and/or indexing processes described below.

The imaging system 110 is configured to form an image of a sample mounted on a slide 80 located in each imaging location on the movable stage 130 during an image forming process that includes the movable stage 130 moving relative to the imaging system 110 along the scan length axis (y-axis) and swathe width axis (x-axis).

The image forming process may be performed with a plurality of slides 80 being held by the slots 152a-f of the copy holder 150 and the copy holder 150 mounted to the movable stage 130 in one of the first-third indexing positions. The copy holder 150 may be mounted to the movable stage 130 in one of the indexing positions via the loading process described below.

During the image forming process, the imaging system 110 may form a respective image of a respective sample mounted on each slide 80 in the first and second imaging locations. If the imaging system 10 is used as the imaging system 110 in the slide imaging apparatus 100, then each image may be formed plurality of swathes, wherein each swathe is formed by a group of scan lines, each scan line being acquired using the scan line detector 14 from a respective elongate region 82 on the surface of the sample that extends along the swathe width axis (x-axis), wherein each group of scan lines is acquired whilst the slide 80 is moved relative to the scan line detector 14 along the scan length axis (y-axis), e.g. in the direction labelled 16 in FIG. 1(a), using the copy holder moving system 120. After one swathe has been acquired, the slide 80 may be moved along the swathe width axis (x-axis), e.g. in the direction labelled 15 in FIG. 1(a), to allow a further swathe to be acquired by moving the slide 80 along the scan length axis (y-axis). This further swathe may be acquired by moving the slide 80 along the scan length axis in a direction opposite to the direction labelled 16 in FIG. 1(a), e.g. such that the slide 80 is moved along a serpentine path during the image forming process.

A focus setting of the imaging system 10 of FIG. 1(a) may be adjusted during the image forming process and even during the acquisition of an individual swathe, for example, by moving the imaging lens 12 along an imaging axis 13. Techniques for measuring and dynamically adjusting focus to maintain the sample in focus along the length of the sample as the slide 80 is moved along the scan length axis are described in the literature, see e.g. U.S. Pat. No. 7,485,834, WO2013/017855 and US2014/0071438.

Figure 4A:
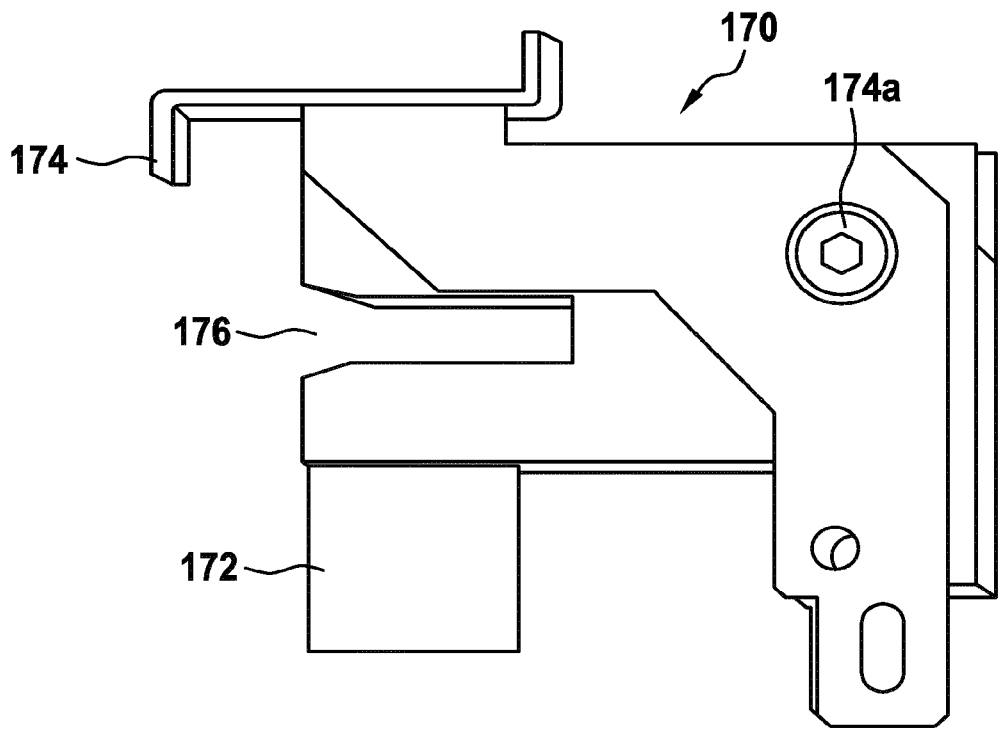
FIGS. 4(a)-(c) show an indexing arm belonging to the copy holder moving system of FIGS. 3(a)-(h) in more detail.
Figure 4B:
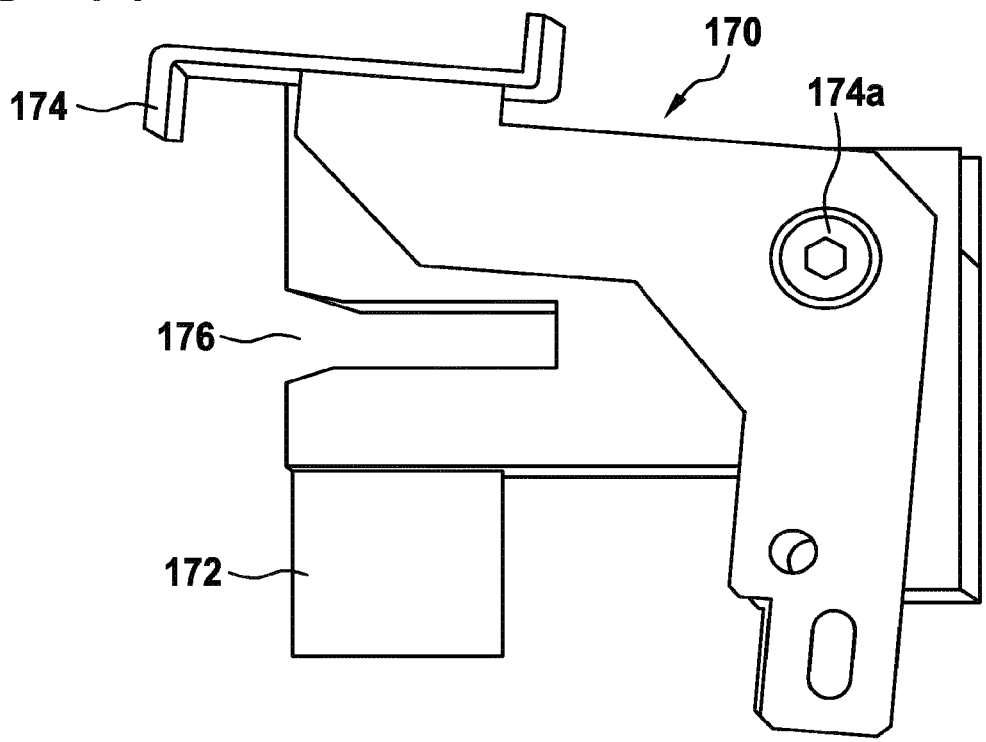
Figure 4C:
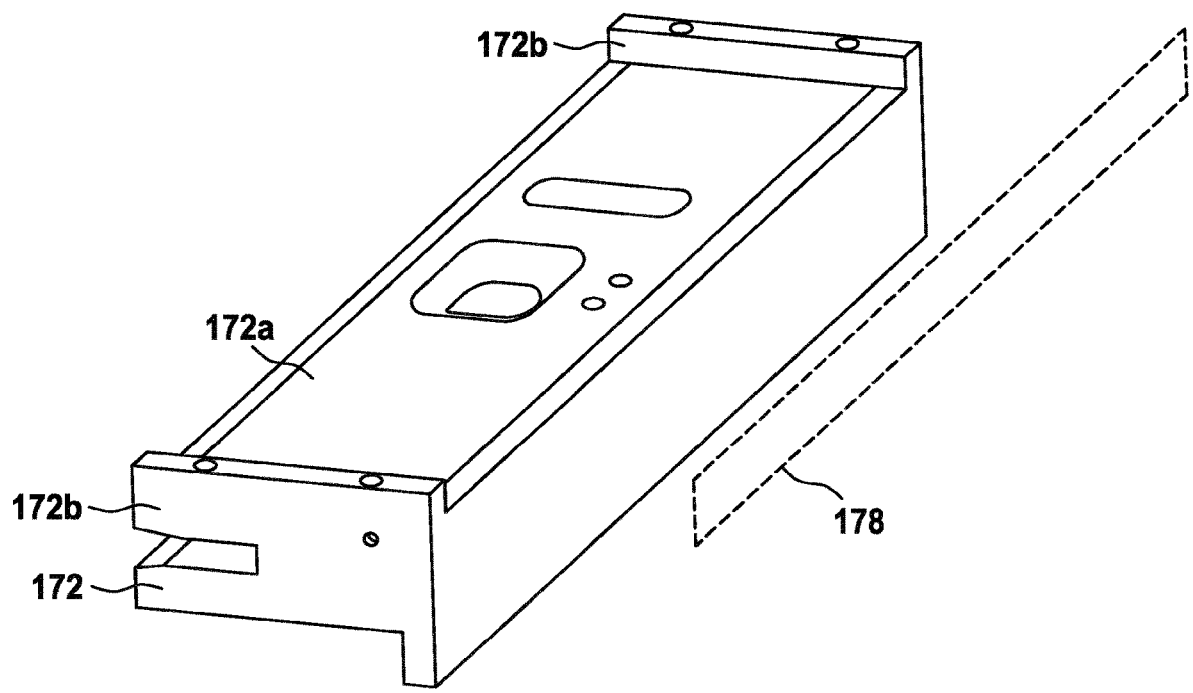

As shown in FIGS. 4(a)-(c), the indexing arm 170 of the copy holder moving system 120 includes a main body 172 and a stopping element 174 pivotally mounted to the main body 172 via a pivot 174a.

As can be seen from FIGS. 4(a) and 4(b), the stopping element 174 can be rotated between an open position as shown in FIG. 4(b) and a closed position as shown in FIG. 4(a).

The indexing arm 170 also has a mouth 176 for holding the copy holder 150 during an indexing operation that will be described in more detail below.

The copy holder moving system 120 also has an indexing motor (not shown) configured to move the indexing arm 170 along an indexing axis (z-axis), e.g. by driving a third movement mechanism (e.g. including a leadscrew, not shown). In this example, the indexing axis (z-axis), scan length axis (y-axis) and swathe width axis (x-axis) are mutually perpendicular, but this need not be the case in all embodiments.

The main body 172 of the indexing arm is shown in FIG. 4(c), with the stopping element 174 and the pivot 174a omitted from this drawing for clarity.

As can be seen from FIG. 4(c), a top surface 172a and side walls 172b formed on the top surface of the main body 172 of the indexing arm 170 provide copy holder guide surfaces, 172a, 172b for guiding the copy holder 150 whilst it is pushed into and/or pulled out from a slot 178, e.g. by a user. The top surface 172a provides a landing area for the copy holder 150 to rest on whilst it is pushed into and/or pulled out from the slot 178.

The slot 178 may be included in a housing (not shown) of the slide imaging apparatus 100, wherein the copy holder 150 is configured to be put in a predetermined copy holder loading location by pushing it at least partially into the slot 178.

The stopping element 174 may be configured to, when it is rotated to the closed position shown in FIG. 4(a), stop the copy holder 150 from being pushed past the predetermined copy holder loading location when it is pushed into the slot 178. The stopping element 174 may further be configured to, when it is rotated to the open position shown in FIG. 4(b), allow the copy holder 150 to be pulled past the predetermined copy holder loading location by the movable stage 130.

The first, second and indexing motors may be configured to move the movable stage 130 and the indexing arm 170 to perform three processes referred to herein as an indexing process, a loading process, an unloading process.

These processes will now be described with reference to FIGS. 5-7, which show these processes using diagrammatical representations of the copy holder moving system 120.

Indexing Process

In the indexing process, the copy holder 150 is moved from a starting one of the indexing positions to a new one of the indexing positions.

An example indexing process will now be described with reference to FIGS. 5(a)-(j) which shows the copy holder 150 being moved from the second indexing position to the first indexing position. Similar processes could be shown for moving the copy holder 150 from any indexing position to any other (e.g. adjacent) indexing position.

The indexing process starts with the copy holder 150 mounted to the movable stage 130 in the starting one of the indexing positions and the indexing arm 170 disengaged from (i.e. not holding) the copy holder 150, e.g. as is the case at the end of the loading process described below.

Figure 5A:
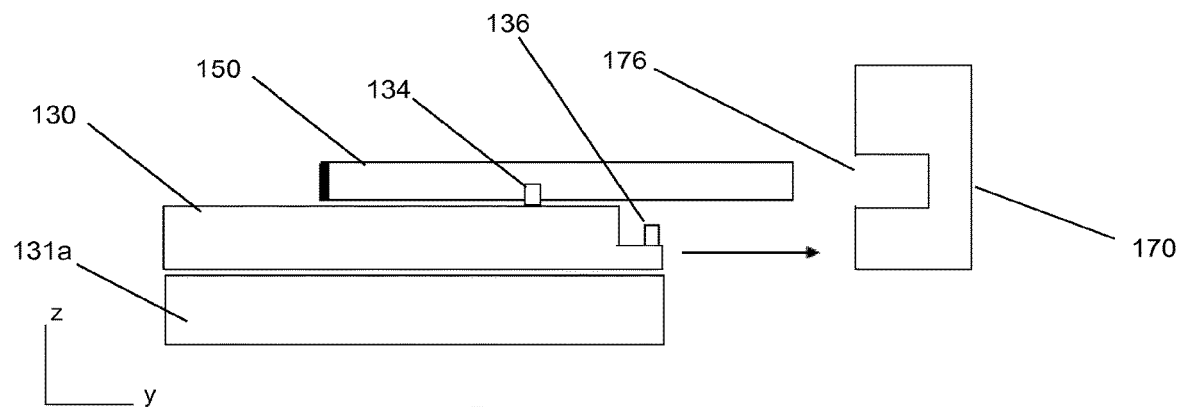
FIGS. 5(a)-(j) show an example indexing process performed by the copy holder moving system of FIGS. 3(a)-(h).
Figure 5B:
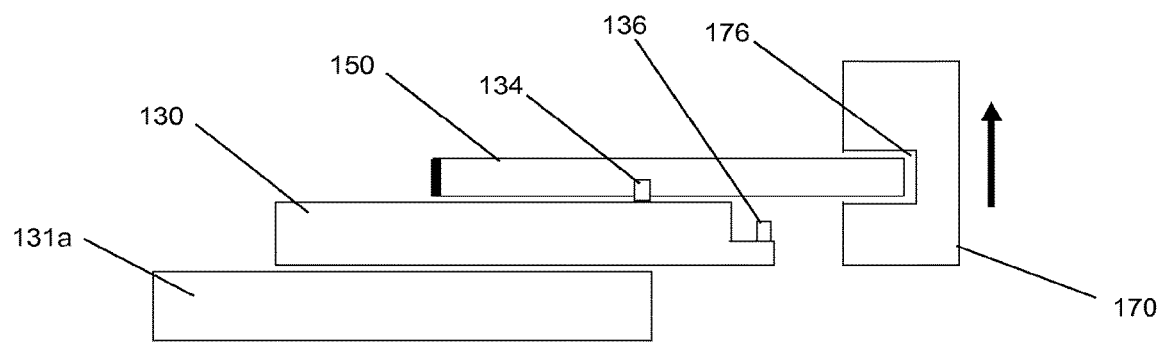
Figure 5C:
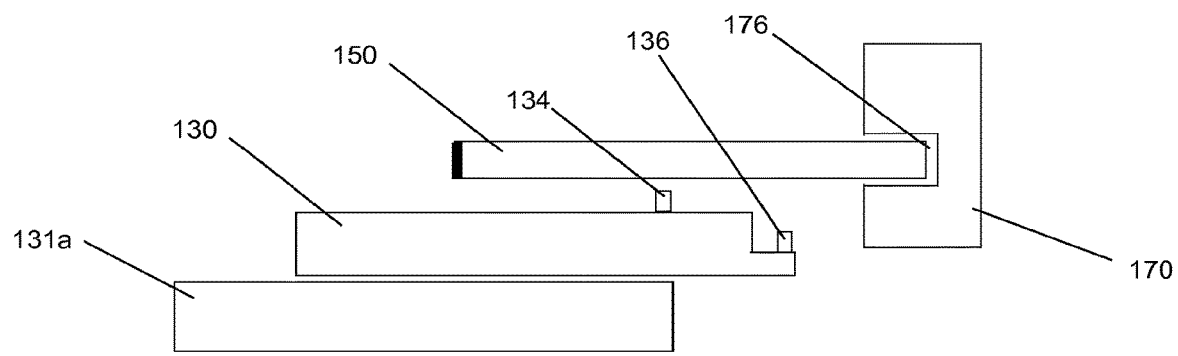
Figure 5D:
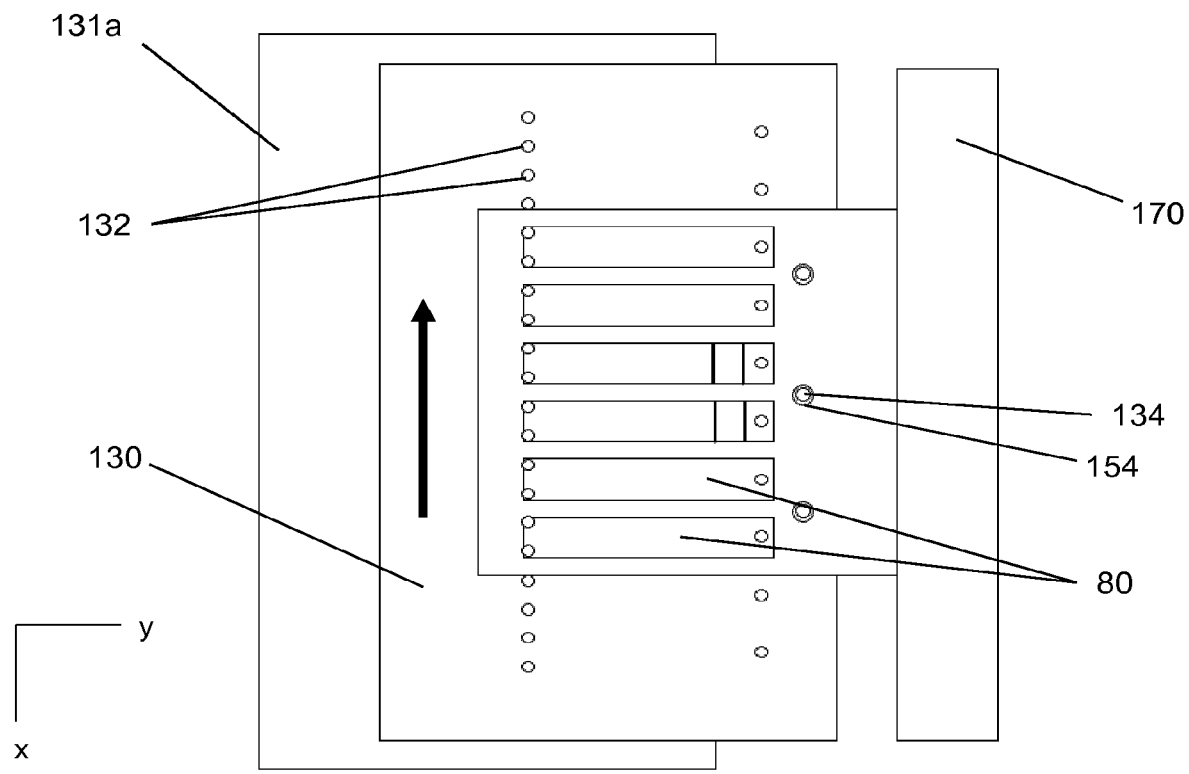
Figure 5E:
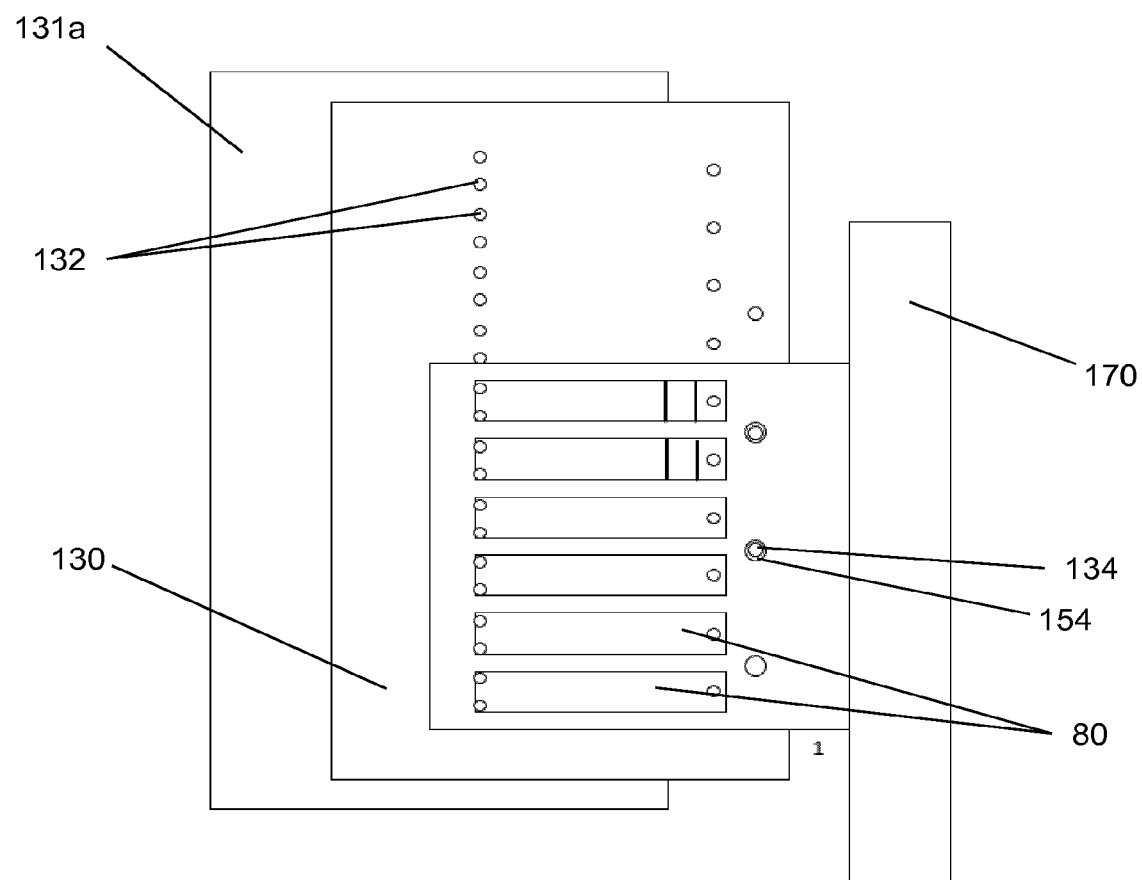
Figure 5F:
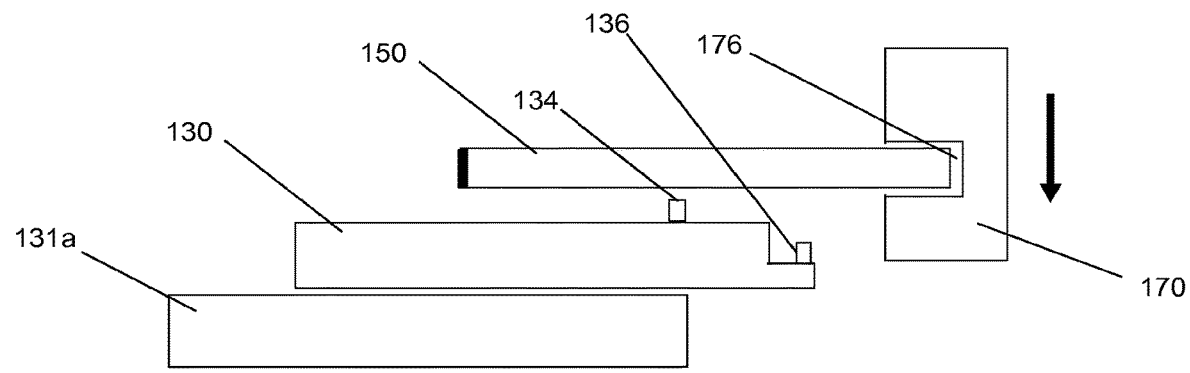
Figure 5G:
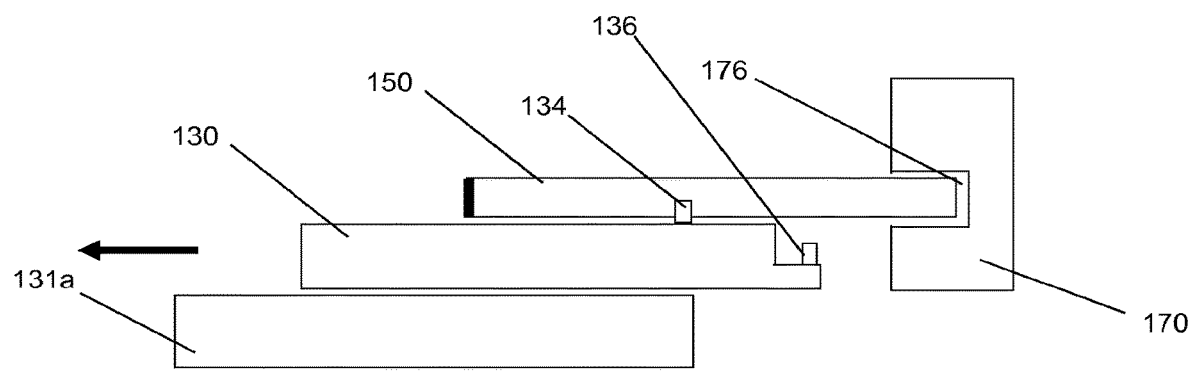
Figure 5H:
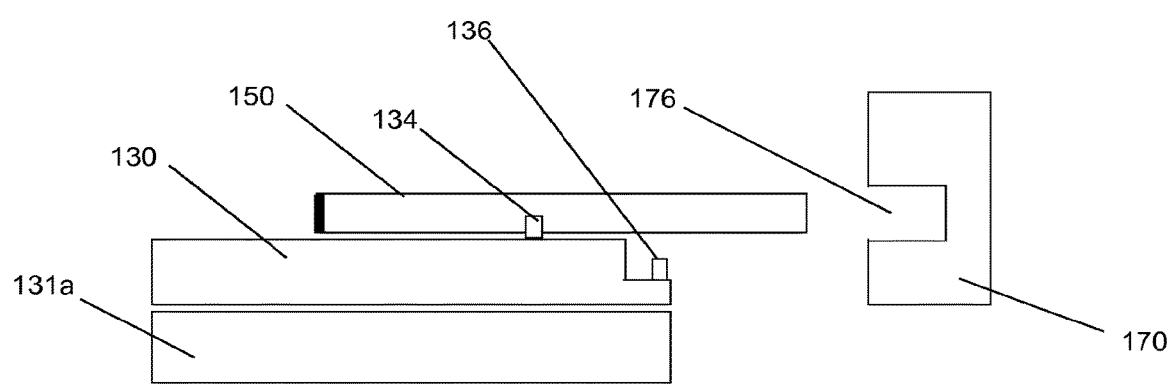
Figure 5I:
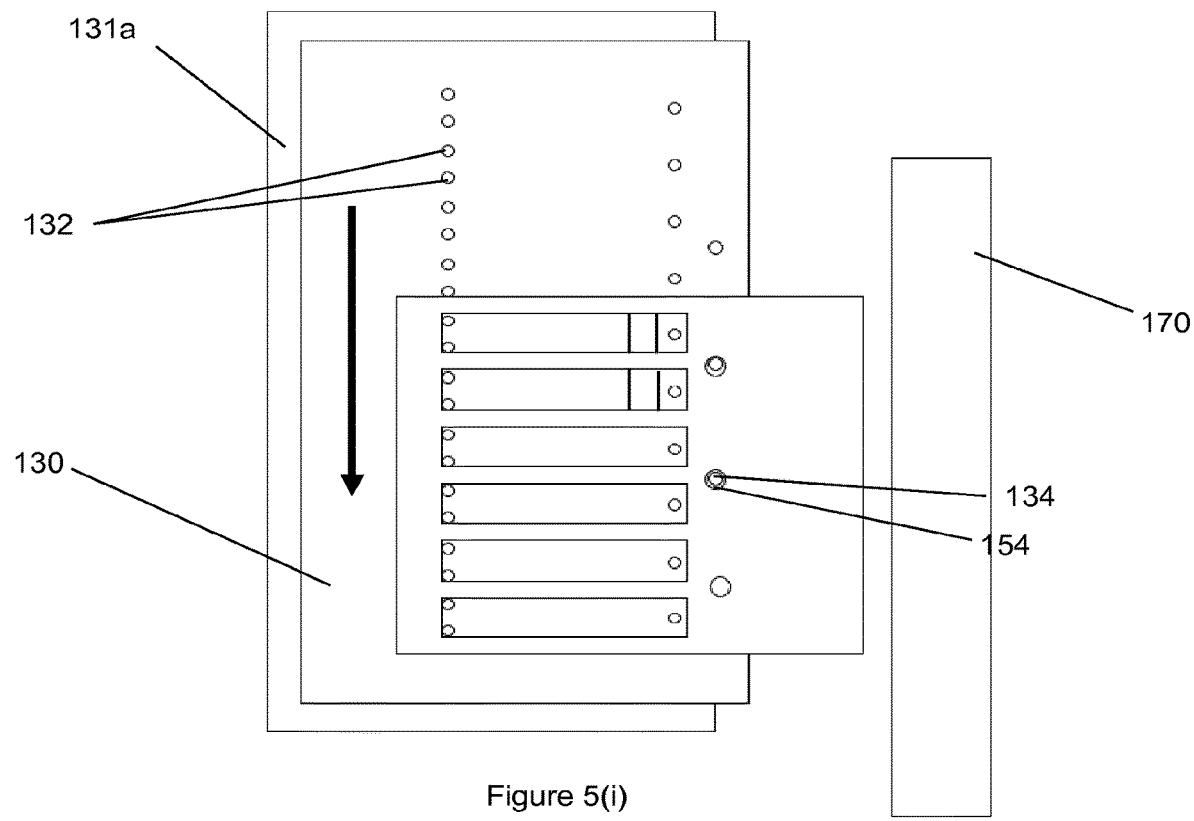
Figure 5J:
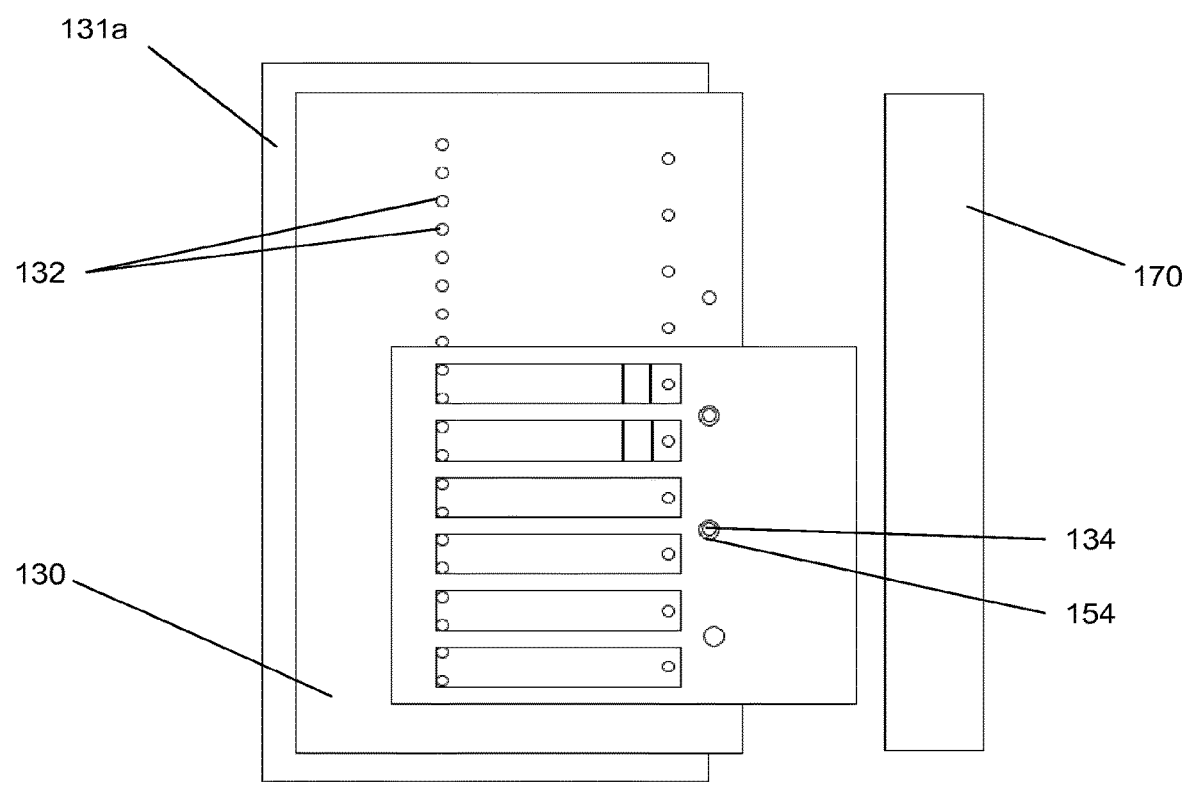

In this example, the indexing process may include the following steps:
- If necessary, the indexing arm 170 is moved along the indexing axis so that the mouth 176 of the indexing arm 170 is level with the copy holder 150, as illustrated by FIG. 5(a).
- The movable stage 130 is moved along the scan length axis towards the indexing arm 170 to engage the copy holder 150 in the mouth 176 of the indexing arm 170 so that the copy holder 150 can be supported by the mouth 176 of the indexing arm 170, as illustrated by FIGS. 5(a) and 5(b).
- The indexing arm 170 is moved along the indexing axis to lift the copy holder 150 off the movable stage 130 and clear of the indexing pins 134, as illustrated by FIGS. 5(b) and 5(c).
- The movable stage 130 is moved along the swathe width axis so that the copy holder 150 is located directly above the new indexing position (which in this example is the first indexing position), as illustrated by FIGS. 5(d) and 5(e).
- The indexing arm 170 is moved along the indexing axis to lower the copy holder 150 onto the movable stage 130, thereby mounting the copy holder 150 to the movable stage 130 in the new indexing position, as illustrated by FIGS. 5(f) and 5(g). The indexing pins 134 and corresponding indexing holes 154 help to correctly fix the position of the copy holder 150 relative to the movable stage 130 as the copy holder 150 is mounted to the movable stage 130 in the new indexing position.
- The movable stage 130 is moved away from the indexing arm 170 along the scan length axis to disengage the copy holder 150 from the mouth 176, as illustrated by FIGS. 5(g) and 5(h).

Once the indexing process has been performed, the image forming process can commence to form an image of a sample mounted on a slide 80 newly located in each imaging position.

FIGS. 5(d)-(e) and 5(i)-(j) show the movable stage as having additional groups of slide support pins 132, so that the slide support pins 132 can support all slides held by the copy holder 150 regardless of which indexing position the copy holder 150 is in. For avoidance of any doubt, this feature is optional.

Loading Process

In the loading process, the copy holder 150 is moved from a predetermined copy holder loading location to be mounted on the movable stage 130 in a predetermined one of the indexing positions.

An example loading process will now be described with reference to FIGS. 6(a)-(h).

In this example, the loading process starts with top surface 172a of the indexing arm 170 positioned along the indexing axis to be level with the top surface 133a of the ledge 133 of the movable stage 130, the movable stage 130 positioned along the scan length axis so that the ledge is under the stopping element 174, and the stopping element 174 in its closed position.

Figure 6A:
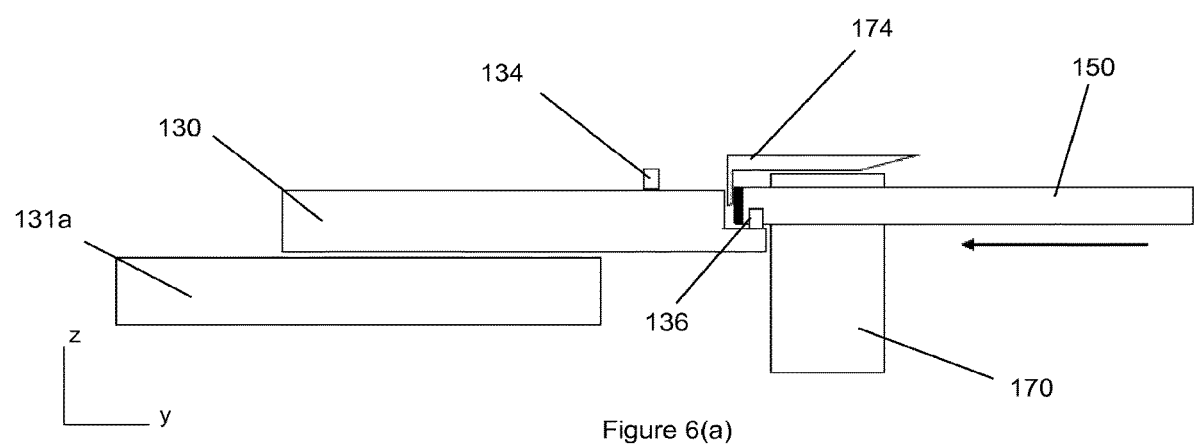
Figure 6B:
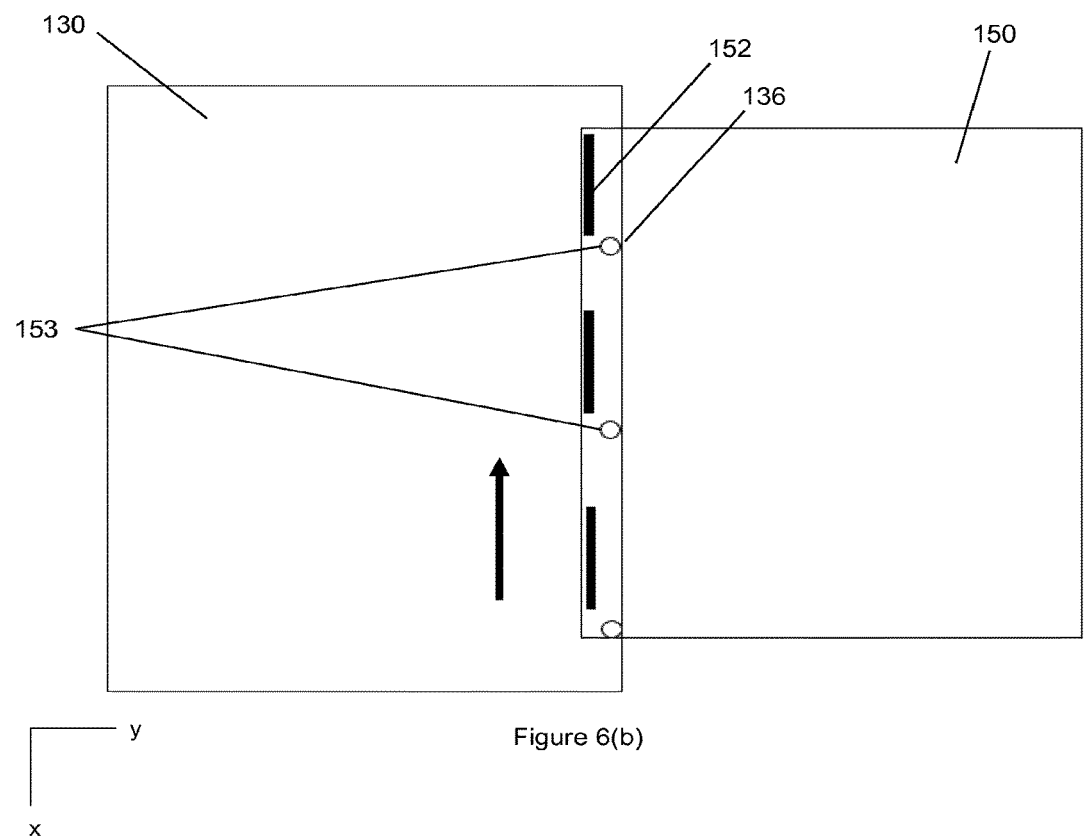

In this example, the predetermined copy holder loading location has the copy holder 150 resting on the top surface 172a of the indexing arm 170, with the copy holder 150 pushed up against the stopping element 174, as illustrated by FIGS. 6(a) and 6(b). As can be seen from FIG. 6(b), with the copy holder 150 in the predetermined copy holder loading location, the copy holder engagement pins 136 formed on the ledge 133 of the movable stage 130 are underneath the copy holder 150.

The copy holder 150 may be put in the copy holder loading location during a pre-loading process by pushing it at least partially into the slot 178 (as indicated by the arrow in FIG. 6(a)), wherein a front end of the copy holder 150 is able to be pushed past the engagement pins 136 by virtue of the cut outs 153 included in the lip 152 on the bottom surface 150b of the copy holder 150. The stopping element 174, rotated to its closed position, stops the copy holder 150 from being pushed past the predetermined copy holder loading location when it is pushed into the slot 178.

In this example, the slot 178 in the housing of the slide imaging apparatus is located along in the indexing axis to be aligned with the ledge 133 on the movable stage 130 (which cannot itself move along the indexing axis) and located along the swath width axis to be aligned with the copy holder guide surfaces 172a, 172b on the indexing arm (which itself cannot move along the swathe width axis) to facilitate the pre-loading process.

An optional alignment check may be performed using sensors mounted on the indexing arm 170 to make sure copy holder 150 is not skewed or otherwise out of the predetermined copy holder loading location relative to the copy holder guide surfaces 172a, 172b on the indexing arm 170, prior to performing the loading process.

Figure 6C:
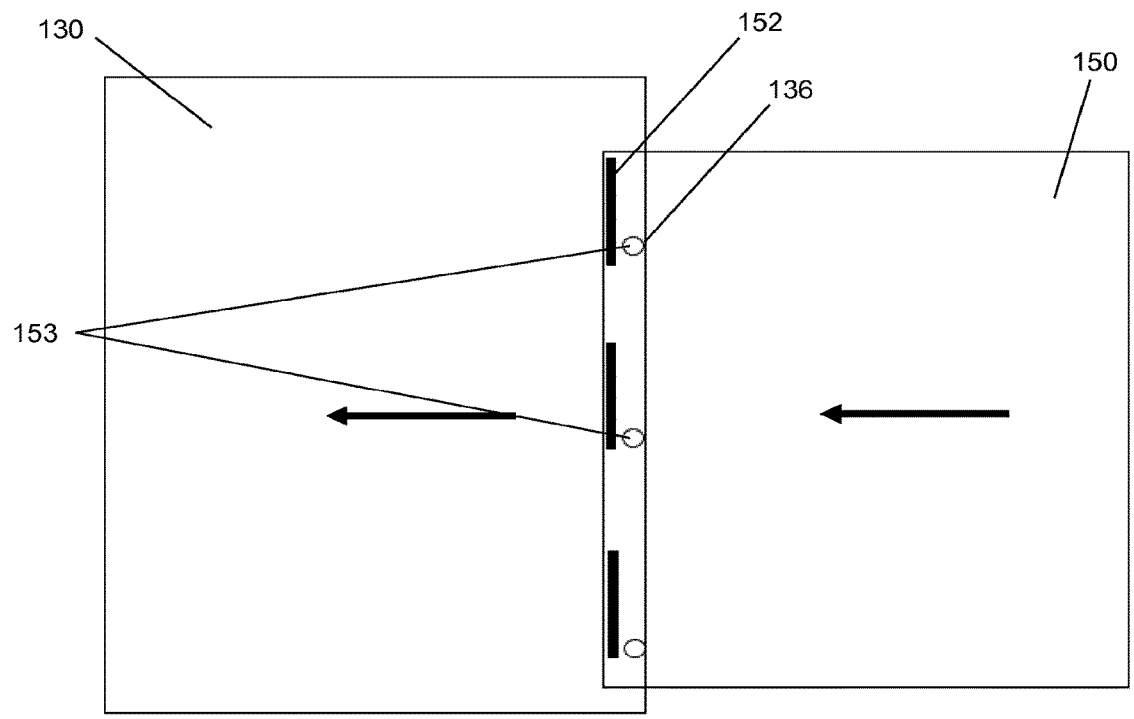
Figure 6D:
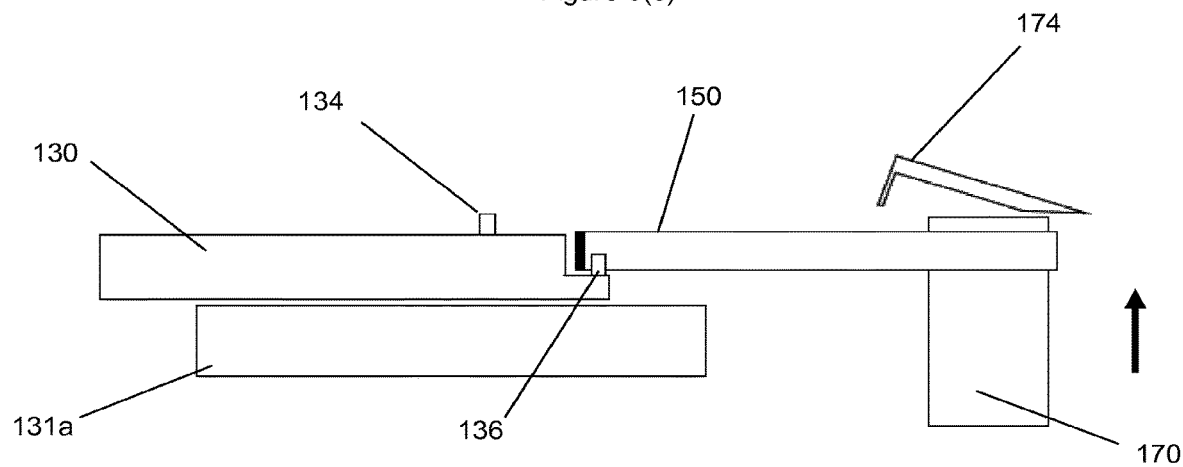

In this example, the loading process may include the following steps:
- The movable stage 130 is moved a small distance along the swathe width axis (x-axis) so that each copy holder engagement pin 136 is located behind the lip 152 on the bottom surface 150b of the copy holder 150, as illustrated by FIGS. 6(b) and 6(c).
- The stopping element 174 is rotated to the open position to allow the copy holder 150 to be pulled away from the predetermined copy holder loading location and towards the imaging system 110 by the movable stage 130.
- The movable stage 130 is moved away from the indexing arm 170 along the scan length axis (y-axis), the copy holder engagement pins 136 engage with the lip 152 on the bottom surface 150b of the copy holder 150 so that the movable stage 130 pulls the copy holder 150 away from the predetermined copy holder loading location and towards the imaging system 110 until a rear end of the copy holder 150 sits on the top surface 172a of the indexing arm, as illustrated by FIGS. 6(c) and 6(d).

The indexing arm 170 is moved along the indexing axis (z-axis) to disengage the copy holder 150 from the copy holder engagement pins 136 and lift the copy holder 150 off the movable stage 130, as illustrated by FIGS. 6(d) and 6(e). The copy holder 150 may be prevented from tipping off the top surface 172a of the indexing arm 170 at this time by two opposing guide ridges (not shown) that are located at top of the side walls 172b on the top surface of the indexing arm, and extend partially over the top surface 150a of the copy holder 150 when the copy holder 150 is resting on the top surface 172a of the indexing arm 170. These guide ridges, together with the guide surfaces 172a, 172b can be viewed as providing a slot at the top of the indexing arm 170.

The movable stage 130 is moved along the scan length axis (y-axis) towards the indexing arm 170 so that the copy holder 150 is located directly above the predetermined indexing position (which in this example is the second indexing position), as illustrated by FIGS. 6(e) and 6(f). Note that in this example, the features on the movable stage 130 and copy holder 150 (e.g. the slide support pins 132, the engagement pins 136 and the cut outs 153) and the slot 176 are configured so that an additional movement of the movable stage 130 along the swathe width axis (x-axis) is not needed to locate the copy holder 150 directly above one of the indexing positions. However, in other examples, there may be an additional step at this point of moving the movable stage 130 along the swathe width axis (x-axis) in order for the copy holder 150 to be located directly above the predetermined indexing position.

The indexing arm 170 is moved along the indexing axis to lower the copy holder 150 onto the movable stage 130, thereby mounting the copy holder 150 to the movable stage 130 in the predetermined indexing position, as illustrated by FIGS. 6(f) and 6(g). The indexing pins 134 and corresponding indexing holes 154 help to correctly fix the position of the copy holder 150 relative to the movable stage 130 as the copy holder 150 is mounted to the movable stage 130 in the predetermined indexing position.

The movable stage 130 is moved away from the indexing arm 170 along the scan length axis to disengage the copy holder 150 from the guide surfaces 172a, 172b of the indexing arm, as illustrated by FIGS. 6(g) and 6(h).

Once the loading process has been performed, the image forming process can commence to form an image of a sample mounted on a slide 80 located in each imaging position.

Unloading Process

In the unloading process, the copy holder 150 is moved from being mounted on the movable stage 130 in a predetermined one of the indexing positions to a predetermined copy holder unloading location.

An example unloading process will now be described with reference to FIGS. 7(a)-(i).

In this example, the unloading process starts with the copy holder 150 mounted to the movable stage 130 in a predetermined one of the indexing positions (which in this example is the second indexing position), the indexing arm 170 disengaged from (i.e. not holding) the copy holder 150 and the guide surfaces 172a, 172b of the indexing arm 170 aligned with the copy holder 150, e.g. as may be the case at the end of the loading process described above.

Figure 7A:
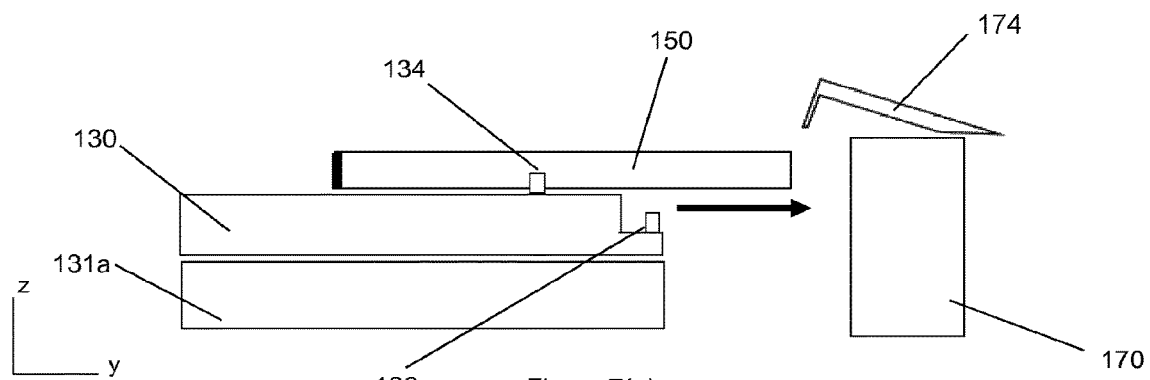
FIGS. 7(a)-(i) show an example unloading process performed by copy holder moving system of FIGS. 3(a)-(h).
Figure 7B:
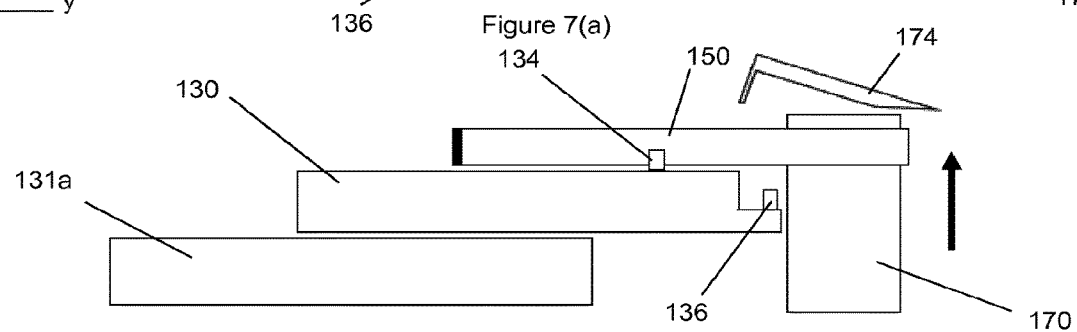

The unloading process may include the following steps:

The movable stage 130 is moved towards the indexing arm 170 so that a rear end of the copy holder 150 rests on the top surface 172a of the indexing arm 170, as illustrated by FIGS. 7(a) and 7(b).

Figure 7C:
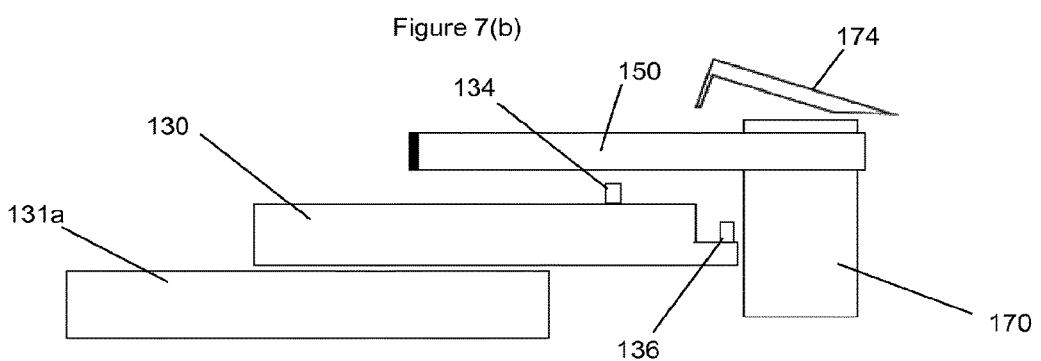

The indexing arm 170 is moved along the indexing axis to lift the copy holder 150 off the movable stage 130 and clear of the indexing pins 134, as illustrated by FIGS. 7(b) and 7(c). The copy holder 150 may be prevented from tipping off the top surface 172a of the indexing arm 170 at this time by the two opposing guide ridges located at top of the side walls 172b on the top surface of the indexing arm 170, as described above.

Figure 7D:
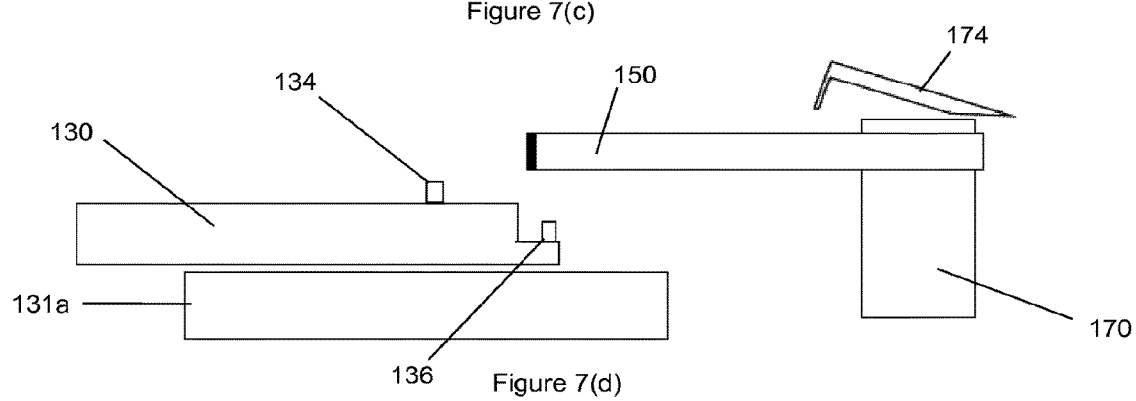

The movable stage 130 is moved along the scan length axis so that the front end of the copy holder 150 is over the ledge 133 of the movable stage 130, as illustrated by FIGS. 7(c) and 7(d).

Figure 7E:
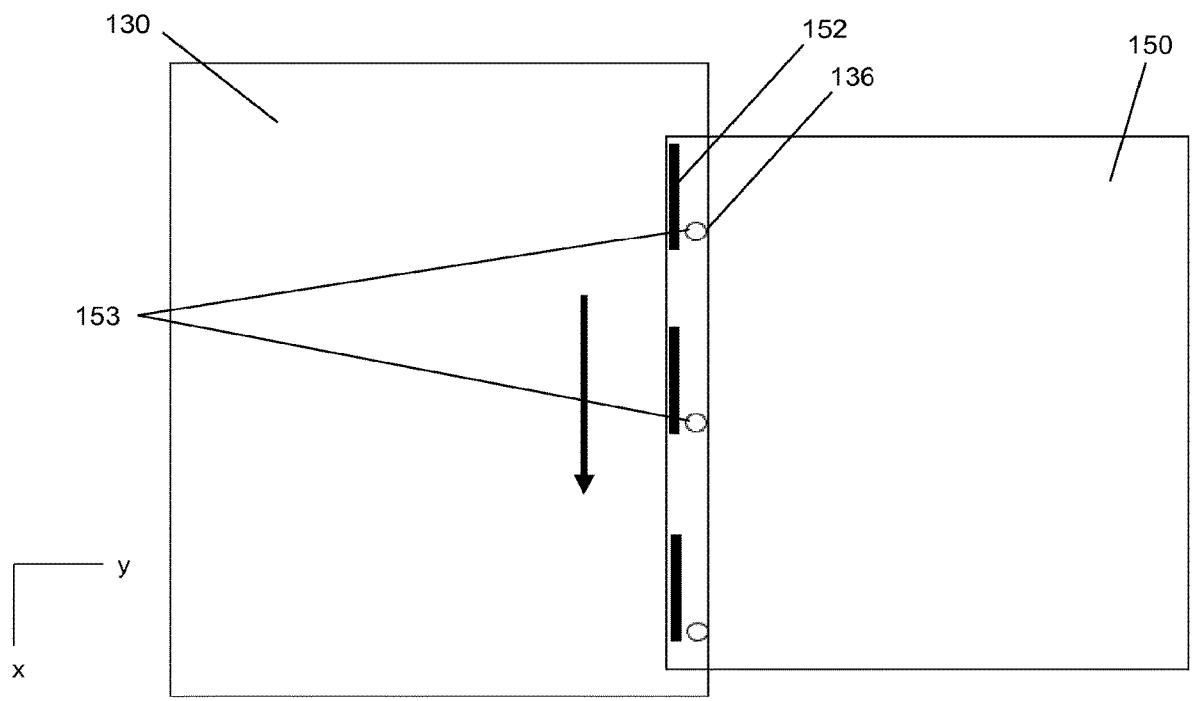
Figure 7F:
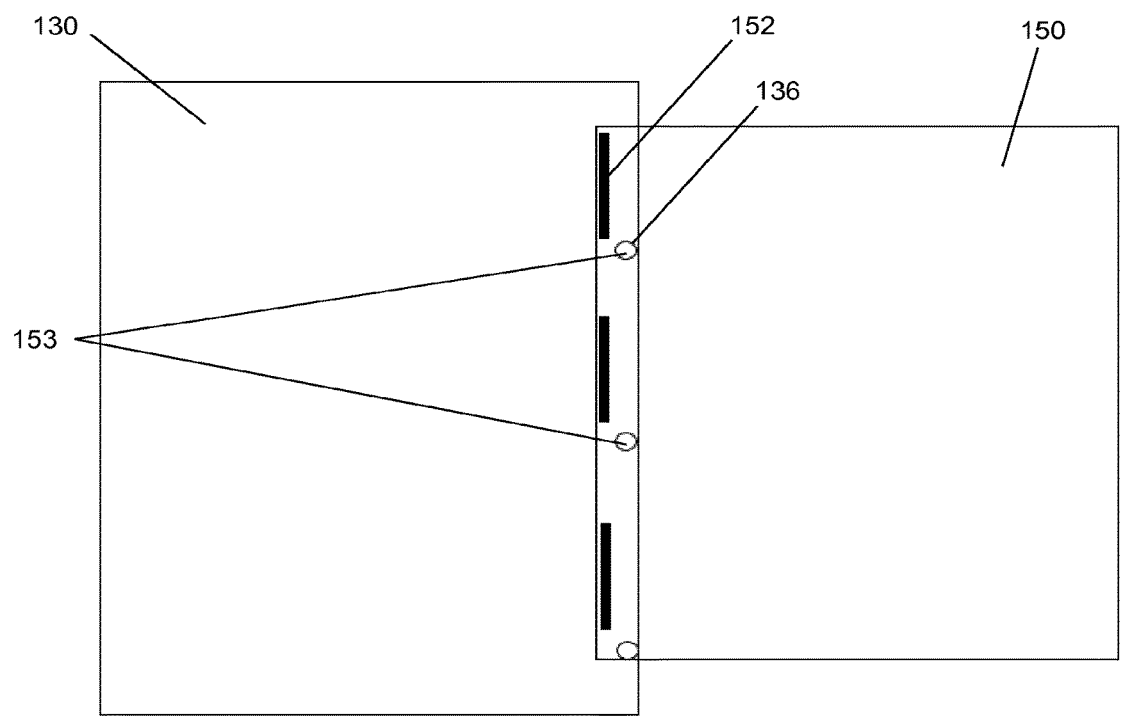

If necessary, the movable stage 130 is moved a small distance along the swathe width axis (x-axis) so that each copy holder engagement pin 136 is aligned with a cut out 153 in the lip 152 on the bottom surface 150b of the copy holder 150 along the swathe width axis (x-axis), as illustrated by FIGS. 7(e) and 7(f). This movement allows the copy holder 150 to be pulled out of the slide scanning apparatus 100 (e.g. by a user), when the copy holder 150 has been moved to the predetermined copy holder unloading location. Note that if the copy holder engagement pins 136 were not aligned with the cut outs 153 along the swathe width axis (x-axis), then an engagement between the copy holder engagement pins 136 and the lip 152 on the bottom surface 150b of the copy holder 150 could prevent a user from pulling the copy holder 150 out of the slide scanning apparatus from the predetermined copy holder unloading location.

Figure 7G:
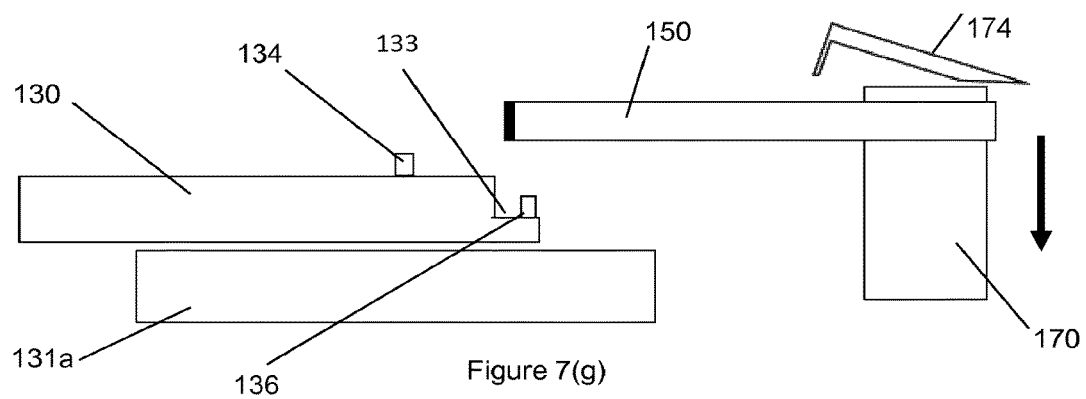
Figure 7H:
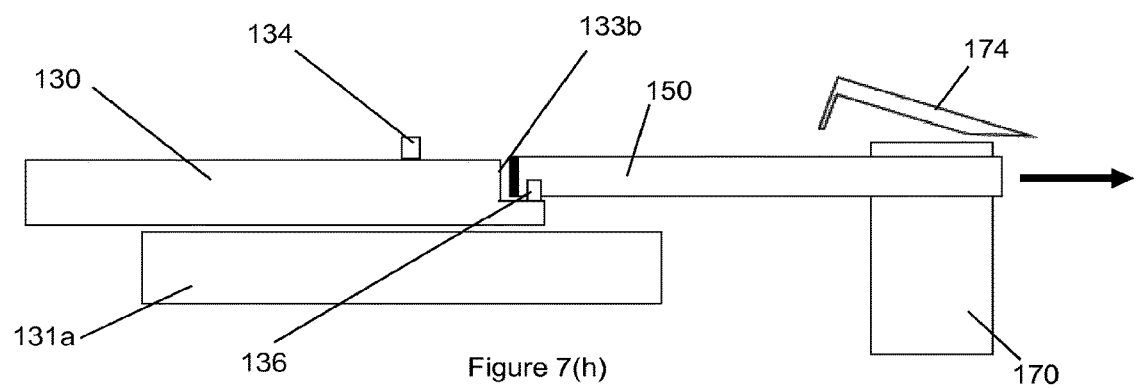

The indexing arm 170 is moved along the indexing axis (z-axis) to lower the copy holder 150 onto the ledge 133 of movable stage 130, as illustrated by FIGS. 7(g) and 7(h).

Figure 7I:
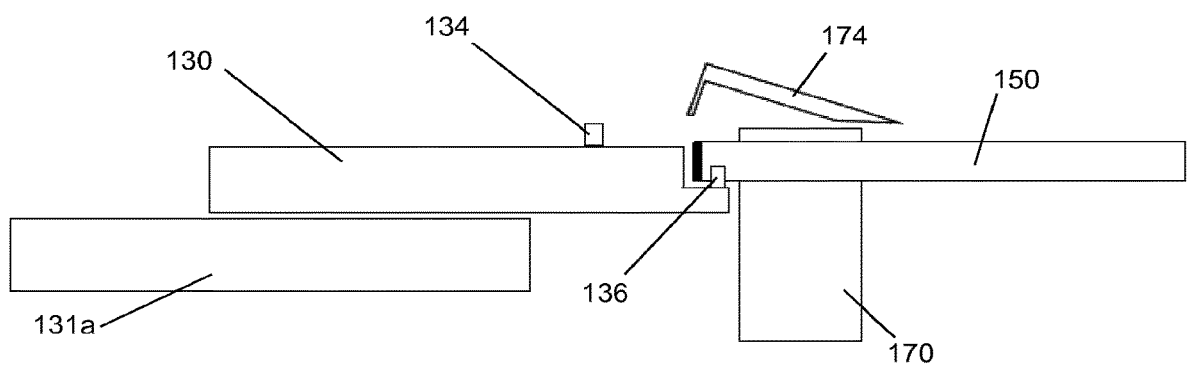

The movable stage 130 is moved along the scan length axis (y-axis) towards the indexing arm 170 so that the push surface 133b of the movable stage pushes the copy holder 150 across the top surface 172a of the indexing arm 170 and at least partially out through the slot 178 in the housing of the slide imaging apparatus 100 to the predetermined copy holder unloading location, as illustrated by FIGS. 7(h) and 7(i).

Once the unloading process has been performed, a user can remove the copy holder 150 by pulling it out of the slot 178 in the housing.

When used in this specification and claims, the terms "comprises" and "comprising", "including" and variations thereof mean that the specified features, steps or integers are included. The terms are not to be interpreted to exclude the possibility of other features, steps or integers being present.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

All references referred to above are hereby incorporated by reference.

The invention claimed is:

1. A slide imaging apparatus that includes:
   a copy holder moving system; and
   an imaging system;
   wherein the copy holder moving system includes:
      a movable stage configured to move along first and second slide movement axes relative to the imaging system, wherein the imaging system is configured to form an image of at least a portion of a sample mounted on a slide located at an imaging location on the movable stage during an image forming process that includes the movable stage moving relative to the imaging system along the first and second slide movement axes;
      a copy holder configured to be mounted to the movable stage, wherein the copy holder includes:
      a plurality of apertures, each aperture being configured to hold a respective slide;
      an indexing arm for holding the copy holder; and
      an indexing motor configured to move the indexing arm along an indexing axis that is nonparallel with respect to both the first and second slide movement axes; and
      wherein the copy holder is configured to be mounted to the movable stage in each of a plurality of indexing positions.

2. The slide imaging apparatus according to claim 1, wherein the copy holder moving system includes one or more motors configured to move the movable stage along the first slide movement axis and separately along the second slide movement axis.

3. The slide imaging apparatus according to claim 1, wherein the copy holder moving system is configured to perform an indexing process that moves the copy holder from one of the plurality of indexing positions to another of the plurality of indexing positions.

4. The slide imaging apparatus according to claim 1 wherein: the copy holder moving system is configured to move from one of the plurality of indexing positions to another of the plurality of indexing positions by moving the indexing motor along the indexing axis and by moving as the movable stage being moved along the first and second slide movement axes by one or more motors.

5. The slide imaging apparatus according to claim 1, wherein:
   the copy holder moving system is configured to perform
      a copy holder loading process that moves the copy holder from a predetermined copy holder loading location to be mounted on the movable stage in one of the plurality of indexing positions; and
      a copy holder loading process that moves the copy holder from the predetermined copy holder loading location to be mounted on the movable stage in one of the indexing positions includes moving the indexing arm by an indexing motor along an indexing axis as well as the movable stage being moved one or more motors along the first and/or second slide movement axes.

6. The slide imaging apparatus according to claim 1, wherein the copy holder and the movable stage each have one or more engagement formations, which are configured to engage with each other to facilitate the movable stage pulling the copy holder away from a predetermined copy holder loading location during the copy holder loading process.

7. The slide imaging apparatus according to claim 6, wherein the one or more engagement formations include one or more pins formed on the movable stage and a lip located on a bottom surface of the copy holder.

8. The slide imaging apparatus according to claim 1, wherein:
   the copy holder moving system is configured to perform a copy holder unloading process that moves the copy holder from being mounted on the movable stage in one of the indexing positions to a predetermined copy holder unloading location; and
   the copy holder unloading process includes the indexing arm being moved by an indexing motor along the indexing axis and the movable stage being moved.

9. The slide imaging apparatus according to any claim 1, wherein the copy holder and the movable stage each have one or more indexing formations, which are configured to integrate with each other so as to act to fix a position of the copy holder relative to the movable stage when the copy holder is mounted to the movable stage in an indexing position of the plurality of indexing positions.

10. The slide imaging apparatus according to claim 9, wherein the indexing formations include:
    one or more pins formed on the movable stage and one or more corresponding holes formed in the copy holder; or
    one or more pins formed on the copy holder and one or more corresponding holes formed in the movable stage.

11. The slide imaging apparatus of claim 1, wherein the movable stage includes a set of structural supports to support subsets of the slides held by the copy holder in corresponding imaging locations.

12. A method for imaging a set of sample slices, the method comprising: capturing, using an imaging system, a first image of a first sample slice of the set of sample slices, the first sample slice being positionally constrained within an aperture in a movable stage, wherein the movable stage is configured to move along first and second slide movement axes relative to the imaging system; using a copy holder moving system to move the movable stage, wherein the copy holder includes: a plurality of apertures, each aperture being configured to hold a respective slide, the plurality of apertures including the aperture; an indexing arm for holding a copy holder; and an indexing motor configured to move the indexing arm along an indexing axis that is nonparallel with respect to both the first and second slide movement axes; and capturing, using the imaging system, a second image of a second sample slice of the set of sample slices.

13. The method of claim 12, wherein the copy holder moving system includes one or more motors, and wherein using the copy holder moving system to move the movable stage includes using the one or more motors move the movable stage along the first slide movement axis and separately along the second slide movement axis.

14. The method of claim 12, further comprising:
    performing, using the copy holder moving system, an indexing process that moves the copy holder from one of the plurality of indexing positions to another of the plurality of indexing positions.

15. The method of claim 12 wherein:

the copy holder moving system includes an indexing arm for holding the copy holder and an indexing motor configured to move the indexing arm along an indexing axis that is nonparallel with respect to both the first and second slide movement axes; and the method further comprises, moving, using the copy holder moving system, from one of the plurality of indexing positions to another of the plurality of indexing positions for image capture by moving the indexing motor along the indexing axis as well as the movable stage being moved along the first and second slide movement axes by one or more motors.

16. The method of claim 12, further comprising:

performing, using the copy holder moving system, a copy holder loading process that moves the copy holder from a predetermined copy holder loading location to be mounted on the movable stage in one of the plurality of indexing positions; and wherein the copy holder loading process includes moving the copy holder from the predetermined copy holder loading location to be mounted on the movable stage in one of the indexing positions, and wherein the copy holder is moved by moving an indexing arm by an indexing motor along an indexing axis and by moving the movable stage being moved one or more motors along the first and/or second slide movement axes.

17. The method of claim 12, wherein the copy holder and the movable stage each have one or more engagement formations, and wherein the method further comprises:

pulling the copy holder away from a predetermined copy holder loading location during the copy holder loading process by engaging the one or more engagement formations of the copy holder with the one or more engagement formations of the movable stage.

18. A method of claim 17, wherein the one or more engagement formations include one or more pins formed on the movable stage and a lip located on a bottom surface of the copy holder.

19. The method of claim 12, wherein:

performing, using the copy holder moving system, a copy holder unloading process that moves the copy holder from being mounted on the movable stage in one of the indexing positions to a predetermined copy holder unloading location; and performing the copy holder unloading process by moving the indexing arm by an indexing motor along the indexing axis and the movable stage being moved.

* * * * *